US008602900B2

(12) United States Patent
Saeki et al.

(10) Patent No.: US 8,602,900 B2
(45) Date of Patent: Dec. 10, 2013

(54) TORQUE FLUCTUATION ABSORBER

(71) Applicant: Aisin Seiki Kabushiki Kaisha, Kariya (JP)

(72) Inventors: Tomohiro Saeki, Anjo (JP); Satoshi Nakagaito, Kariya (JP); Hiroaki Suezaki, Anjo (JP); Yuki Miyamoto, Kariya (JP); Masanori Suzuki, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/716,304

(22) Filed: Dec. 17, 2012

(65) Prior Publication Data
US 2013/0109482 A1    May 2, 2013

Related U.S. Application Data

(62) Division of application No. 12/730,691, filed on Mar. 24, 2010, now Pat. No. 8,357,050.

(30) Foreign Application Priority Data

Mar. 25, 2009 (JP) ................................ 2009-074051

(51) Int. Cl.
F16D 7/02      (2006.01)
(52) U.S. Cl.
USPC ........................................................ 464/46
(58) Field of Classification Search
USPC .............................. 464/43, 46, 68.1; 267/161
See application file for complete search history.

(56) References Cited

U.S. PATENT DOCUMENTS

| 1,980,185 | A | * | 11/1934 | Chilton ...................... 464/46 X |
| 2,146,582 | A | * | 2/1939 | Kohlhepp ................... 464/46 X |
| 3,201,953 | A | * | 8/1965 | Firth ............................... 464/46 |
| 3,315,773 | A | | 4/1967 | Aschauer |
| 7,207,887 | B2 | | 4/2007 | Nakagaito et al. |
| 2008/0078646 | A1 | | 4/2008 | Ebata |

FOREIGN PATENT DOCUMENTS

| JP | 59-47127 U | 3/1984 |
| JP | 63-48815 Y2 | 12/1988 |
| JP | 2005-127507 A | 5/2005 |
| JP | 2006-283942 A | 10/2006 |
| JP | 2007-107549 A | 4/2007 |
| JP | 2008-089017 A | 4/2008 |

OTHER PUBLICATIONS

Japanese Notice of Grounds of Rejection dated Feb. 12, 2013 issued in the corresponding Japanese Patent Application No. 2009-074051 and English-language translation.
Japanese Official Action dated Jun. 5, 2013 issued in the corresponding Japanese Patent Application No. 2009-074051 and English language translation.

* cited by examiner

Primary Examiner — Gregory Binda
(74) Attorney, Agent, or Firm — Buchanan Ingersoll & Rooney PC

(57) ABSTRACT

A torque fluctuation absorber includes a first plate member to which power of rotation is transmitted from a first rotational shaft, a second plate member arranged at a preset distance from the first plate member, a third plate member arranged between the first plate member and the second plate member and configured to transmit power of rotation to a second rotational shaft. The torque fluctuation absorber also includes a fourth plate member arranged at a preset distance from the second plate member, and a resilient member arranged between the second plate member and the fourth plate member and configured to bias the second plate member towards the third plate member. The fourth plate member includes a fulcrum point that supports a mid portion of the resilient member.

4 Claims, 27 Drawing Sheets

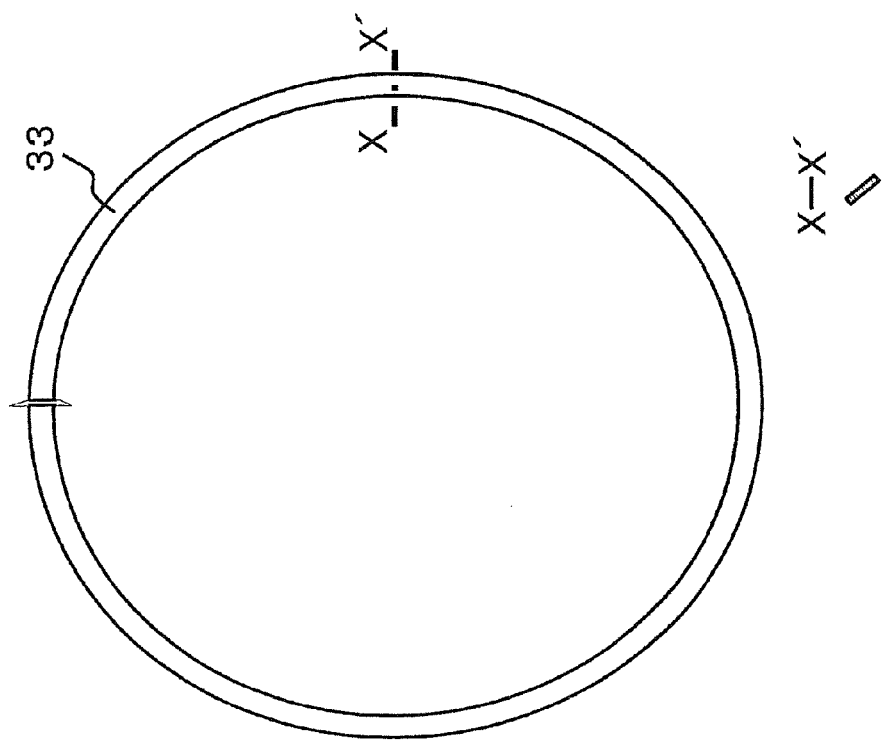
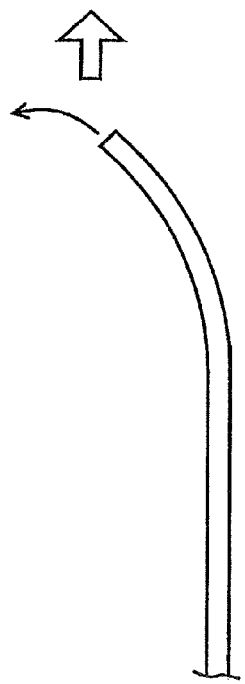
FIG. 24A
FIG. 24B

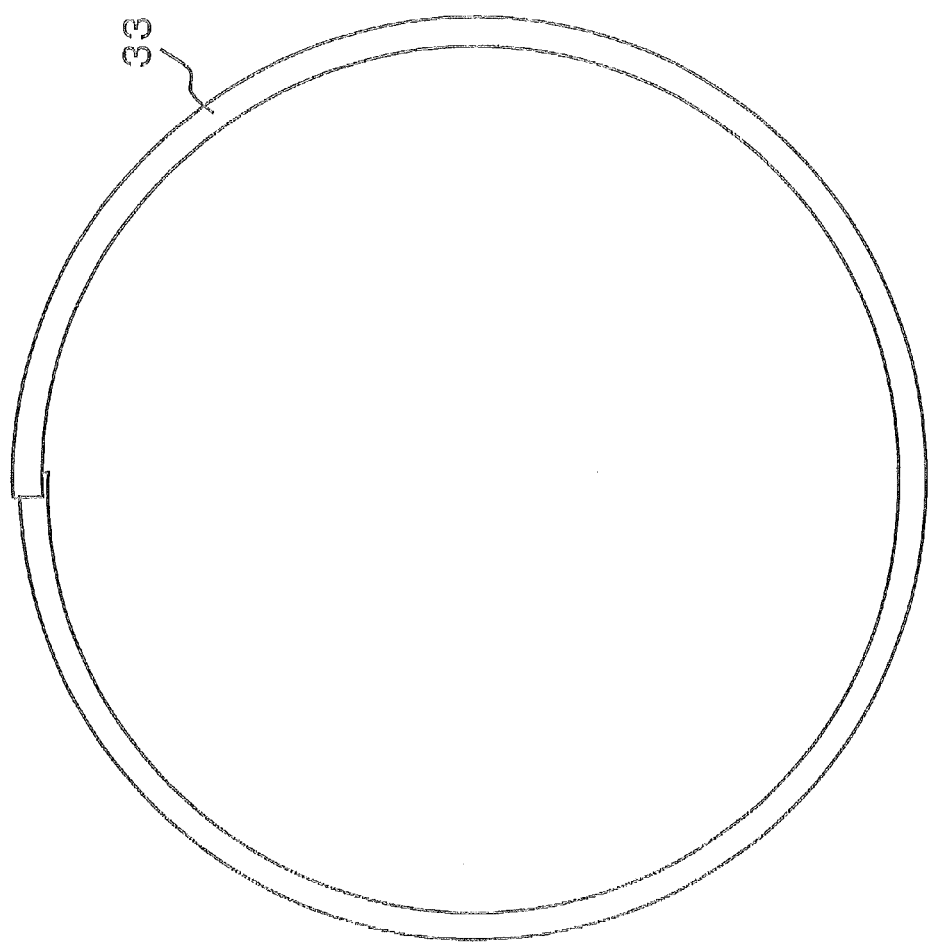

TORQUE FLUCTUATION ABSORBER

CROSS REFERENCE TO RELATED APPLICATION

This application is a Divisional of U.S. patent application Ser. No. 12/730,691, filed on Mar. 24, 2010, now U.S. Pat. No. 8,357,050, and claims priority under 35 U.S.C. §119 to Japanese Patent Application No. 2009-074051 filed on Mar. 25, 2009, the entire contents of each of which are incorporated herein by reference.

TECHNICAL FIELD

This disclosure relates to a torque fluctuation absorber that takes up torque fluctuations between rotational shafts. More particularly, it relates to a torque fluctuation absorber having a limiter unit that produces slip when the fluctuating torque has reached a preset value.

BACKGROUND DISCUSSION

A torque fluctuation absorber is arranged e.g. on a power transmission path between an engine and a motor in e.g. a hybrid car to absorb or suppress the torque fluctuations caused in the engine and the motor. The torque fluctuation absorber may include a damper unit that takes up the torque fluctuations by a spring force, a hysteresis unit that absorbs or suppresses the torque fluctuations by the hysteresis torque caused by friction, and a limiter unit. The limiter unit produces slip when the torsion of the rotational shafts may no longer be taken up by the damper unit or the hysteresis unit.

The limiter unit is composed of a friction material sandwiched between two plates. One of the plates is non-rotatable and axially movable with respect to the other. One of the plates is biased towards the friction material by a conical spring (see Patent Publication 1, for example). The conical spring is arranged as a continuous annular member, and is inclined from an inner peripheral side towards an outer peripheral side.

PATENT DOCUMENT

[Patent Document 1]
JP 2005-127507A (FIG. 2)

The entire disclosures of the above-mentioned Patent Document 1 are incorporated herein by reference thereto. An analysis by the present disclosure will be given below.

The conical spring has an inner peripheral end abutted against a plate, while having an outer peripheral end supported by another plate. The inner peripheral end of the conical spring abuts against the former plate at a location substantially in register with a friction surface between a friction material and the former plate. As a result, the diameter of the conical spring is increased to elevate the cost of the conical spring and hence that of the entire device. The process of producing the conical spring is time-consuming. Moreover, the spring steel, as a material for the conical spring, is costly as compared to general steel material, thus elevating the cost of the conical spring and hence that of the entire device. In addition, the portion of the material located more radially inwardly than the inner peripheral end of the conical spring is discarded in the production step because of the larger inner diameter of the conical spring. Hence, the manufacture yield is low, with the result that the cost of the conical spring and hence that of the entire device are increased.

Accordingly, there is a need for a torque fluctuation absorber that may be produced at a reduced cost.

SUMMARY

In a first aspect, there is provided a torque fluctuation absorber comprising a first plate member to which power of rotation is transmitted from a first rotational shaft, a second plate member arranged at a preset distance from the first plate member, a third plate member arranged between the first and second plate members and configured to transmit power of rotation to a second rotational shaft, a fourth plate member arranged at a preset distance from the second plate member. The torque fluctuation absorber further comprises a resilient member arranged between the second plate member and the fourth plate member and configured to bias the second plate member towards the third plate member. At least one of the second plate member and the fourth plate member includes a fulcrum point that supports a mid portion of the resilient member.

In a second aspect, there is provided a torque fluctuation absorber, comprising: a first plate member to which power of rotation is transmitted from a first rotational shaft; a second plate member arranged at a preset distance from the first plate member; a third plate member arranged between the first and second plate members and configured to transmit power of rotation to a second rotational shaft; and a fourth plate member arranged at a preset distance from the second plate member. The torque fluctuation absorber further comprises a resilient member arranged between the second plate member and the fourth plate member and configured to bias the second plate member towards the third plate member. The resilient member includes a first end located at a position having a preset distance from a center of rotation of the first rotational shaft and a second end located at a position more closely to the center of rotation of the first rotational shaft than the first end. The first end abuts against the second plate member in an area where the second plate member faces the third plate member in the axial direction. The second end abuts against the fourth plate member.

In a third aspect, there is provided a torque fluctuation absorber, comprising: a first plate member to which the power of rotation is transmitted from a first rotational shaft; a second plate member arranged at a preset distance from the first plate member; a third plate member arranged between the first and second plate members and configured to transmit the power of rotation to a second rotational shaft; and a sheet spring biasing the second plate member towards the third plate member.

BRIEF DESCRIPTION OF THE DRAWINGS

FIG. 24A is an enlarged radial partial cross-sectional view schematically showing the structure of a conical spring of a limiter unit, during manufacture, and FIG. 24B is an enlarged radial partial cross-sectional view schematically showing the structure of the conical spring of the limiter unit, after manufacture, in a torque fluctuation absorber according to Example 12 of the present disclosure, respectively.

FIG. 25 is an enlarged radial partial cross-sectional view schematically showing the structure of a conical spring of the limiter unit in the torque fluctuation absorber according to Example 12 of the present disclosure.

DETAILED DESCRIPTION

Figure 1:
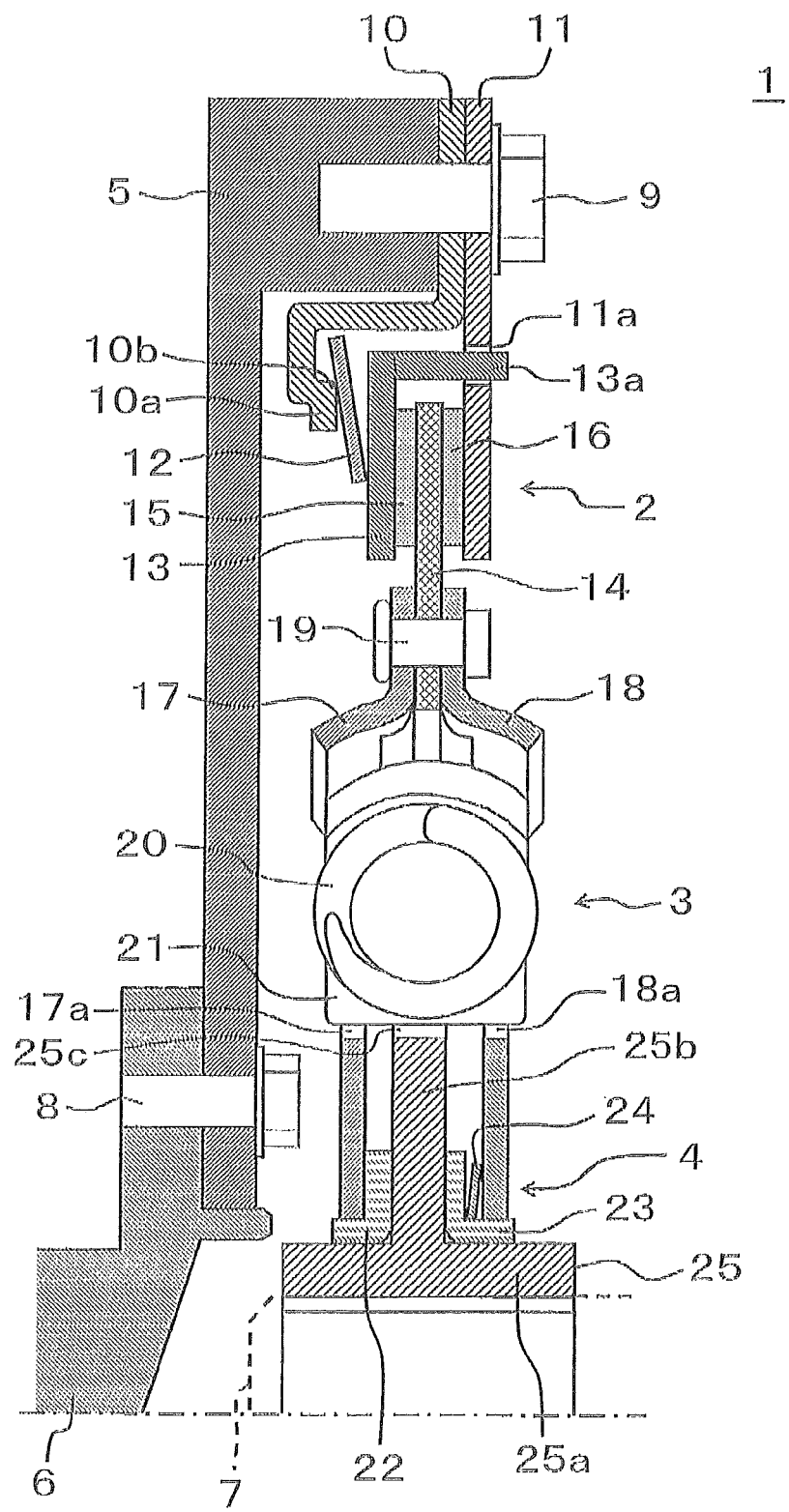
FIG. 1 is a radial partial cross-sectional view schematically showing the structure of a torque fluctuation absorber according to Example 1 of the present disclosure.

The inner circumferential end of the conical spring shown by JP2005-127507A (FIG. 2) abuts to one plate, and the outer circumferential end is supported by the other plate. The inner circumferential end of the conical spring contacts with the one plate at a position corresponding to the friction surface of the friction material against the one plate. Therefore, the conical spring becomes large in diameter, increases its cost, resulting in an increased cost of the apparatus. Also, since the forming process for the conical spring is long and the spring steel used for conical spring is costly as compared to general steel material, the cost of the conical spring is increased, resulting in the increased cost of the apparatus. Further, since the inner diameter of the inner circumferential end of the conical spring is large, and the portion of radially internal of the inner circumferential end is discarded and yield becomes low, which offers the increased cost of the conical spring and also that of the apparatus.

In order to solve the aforementioned problem, various modes are possible according to the present disclosure.

Mode 1 corresponds to the first aspect.

Mode 2.

According to the first aspect, the resilient member is preferably a conical spring.

Mode 3.

According to the first aspect, the fulcrum point is preferably a foremost part of a protrusion formed on at least one of the second plate member and the fourth plate member.

Mode 4.

According to the first aspect, the fulcrum point is preferably an angular part of a step formed on at least one of the second plate member and the fourth plate member.

Mode 5 corresponds to the second aspect.

Mode 6.

In the second aspect, the resilient member is preferably a conical spring.

Mode 7.

In the second aspect, the fourth plate member preferably includes a guide part in an area located radially more inwardly than the second end of the resilient member. The guide part prevents the movement of the resilient member in a direction towards the center of rotation of the first rotational shaft.

Mode 8.

In the second aspect, the second plate member preferably includes a guide part in an area located radially more outwardly than the first end of the resilient member. The guide part prevents the movement of the resilient member in a direction away from the center of rotation of the first rotational shaft.

Mode 9.

The torque fluctuation absorber according to the second aspect preferably includes a flywheel to which the first and fourth plate members are secured. The fourth plate member abuts against the flywheel in the vicinity of a portion of the fourth plate member abutting against the second end of the resilient member.

Mode 10.

In the second aspect, the fourth plate member preferably includes a slit or a bend.

Mode 11.

The torque fluctuation absorber according to the second aspect preferably further comprises a flywheel to which the first and fourth plate members are secured. The resilient member may include an abutment protruded at the second end. The fourth plate member may include a rotation stop non-rotatably and radially non-movably engaged with the abutment. The abutment may abut against the flywheel.

Mode 12 corresponds to the third aspect.

Mode 13

In the third aspect, the sheet spring preferably has one end secured to the second plate member, while having the other end secured to the first plate member.

Mode 14

The torque fluctuation absorber according to the third aspect preferably further comprises a fourth plate member arranged at a preset distance from the second plate member. The sheet spring has one end secured to the second plate member, while having the other end secured to the fourth plate member.

Mode 15

In the third aspect, the second plate member preferably has an inner peripheral protrusion. The one end of the sheet spring is secured to the inner peripheral protrusion of the second plate member.

Mode 16

In the third aspect, the sheet spring preferably is a part of the second plate member. The foremost part of the sheet spring is secured to the first plate member.

Mode 17

The torque fluctuation absorber according to the third aspect preferably further comprises a fourth plate member arranged at a preset distance from the second plate member. The sheet spring is a part of the second plate member, and the foremost part of the sheet spring is secured to the fourth plate member.

Mode 18

The torque fluctuation absorber according to the third aspect preferably further comprises a fourth plate member arranged at a preset distance from the second plate member. The second plate member may include an axially directed protrusion.

The sheet spring may have both ends secured to the fourth plate member. The sheet spring may include a hole engaged by the protrusion of the second plate member.

Mode 19

In a fourth aspect, there is provided a torque fluctuation absorber, comprising: a first plate member to which power of rotation is transmitted from a first rotational shaft, a second plate member arranged at a preset distance from the first plate member, a third plate member arranged between the first and second plate members and configured to transmit power of rotation to a second rotational shaft, a fourth plate member arranged at a preset distance from the second plate member, and a plurality of resilient members arranged between the second plate member and the fourth plate member and configured to bias the second plate member towards the third plate member. Each of the resilient members has a center axis located in a region where the second plate member faces the third plate member along the axial direction.

Mode 20

In the fourth aspect, the resilient member preferably is a conical spring.

Mode 21

In the fourth aspect, the resilient member preferably is a coil spring.

Mode 22

In the fourth aspect, the second plate member or the fourth plate member preferably includes a protrusion facing the resilient member. The protrusion may be introduced into an inner peripheral part of the resilient member.

Mode 23

In a fifth aspect, there is provided a torque fluctuation absorber comprising: a first plate member to which power of rotation is transmitted from a first rotational shaft; a second plate member arranged at a preset distance from the first plate member; a third plate member arranged between the first and second plate members and configured to transmit power of rotation to a second rotational shaft; and a fourth plate member arranged at a preset distance from the second plate member. The torque fluctuation absorber further comprises a resilient member arranged between the second plate member and the fourth plate member and configured to bias the second plate member towards the third plate member. The resilient member is substantially annular and has both ends set apart from one another.

Mode 24

In the fifth aspect, the resilient member preferably is formed like a saucer.

Mode 25

In the fifth aspect, both ends of the resilient member preferably overlap each other along the circumferential direction.

Mode 26

In the fifth aspect, the resilient member is preferably corrugated along a circumferential direction and alternately abuts against the second plate member and the fourth plate member.

Example 1

Figure 2:
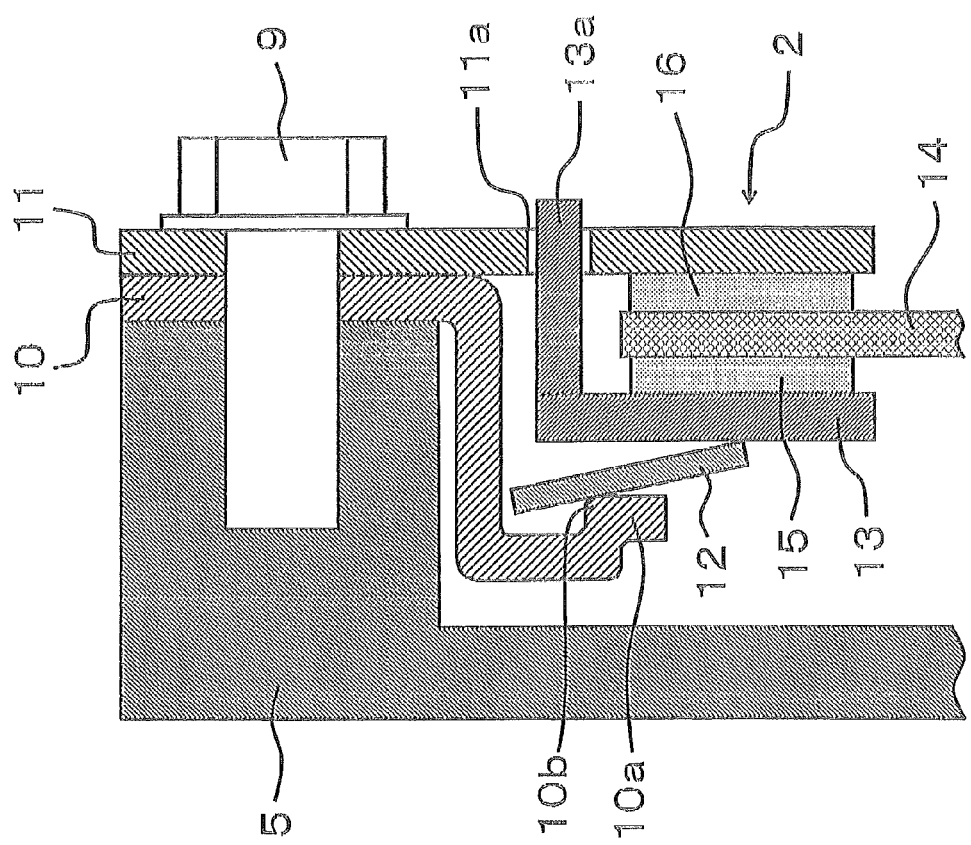
FIG. 2 is an enlarged radial partial cross-sectional view schematically showing the structure of a limiter unit in the torque fluctuation absorber according to Example 1 of the present disclosure.

A torque fluctuation absorber according to Example 1 of the present disclosure will now be described with reference to the drawings. FIG. 1 depicts a partial radial cross-sectional view schematically showing the structure of the torque fluctuation absorber according to Example 1 of the present disclosure. FIG. 2 depicts an enlarged partial radial cross-sectional view schematically showing the structure of the limiter unit in the torque fluctuation absorber according to Example 1 of the present disclosure.

The torque fluctuation absorber 1 according to Example 1 is provided e.g. on a power transmission path between an engine side rotational shaft 6 and a transmission side rotational shaft 7. It is a device for absorbing (suppressing) the fluctuating torque caused by torsion between the engine side rotational shaft 6 and the transmission gear side rotational shaft 7. The torque fluctuation absorber 1 includes a damper unit 3 having a torsion buffering function and configured for absorbing the fluctuating torque by spring force (force of resiliency), and a hysteresis unit 4 that absorbs (suppresses) the fluctuating torque by the hysteresis torque caused e.g. by friction. The torque fluctuation absorber 1 also includes a limiter unit 2 that generates slip when the torsion of the rotational shaft has ceased to be absorbed by the damper unit 3 or by the hysteresis unit 4. The damper unit 3 is arranged on the power transmission path in parallel with the hysteresis unit 4. The limiter unit 2 is arranged on the power transmission path in series with the damper unit 3 and the hysteresis unit 4. The torque fluctuation absorber 1 may be used, in particular, for a hybrid car having no limiter unit in the car, and may also be useful for reducing the system size in a car not having the limiter unit.

The torque fluctuation absorber 1 includes, as component parts, a flywheel 5, a bolt 9, a support plate 10, a cover plate 11, a conical spring 12, a pressure plate 13, a lining plate 14, friction materials 15, 16, side plates 17, 18, a rivet 19, a coil spring 20 and a seat member 21. In addition, the torque fluctuation absorber includes thrust members 22, 23, a conical spring 24 and a hub member 25.

The flywheel 5 is an annular plate member fastened by a bolt(s) 8 to the engine side rotational shaft 6. The flywheel 5 has its periphery protruded towards the limiter unit 2 to form a cylindrical portion. The support plate 10 and the cover plate 11 are fastened by the bolt(s) 9 to this cylindrical portion.

The bolt(s) 9 is a member used for fastening the support plate 10 and the cover plate 11 to the flywheel 5.

The support plate 10 is an annular plate-like member arranged between the flywheel 5 and the cover plate 11, and is a structural part of the limiter unit 2. The support plate 10 is set at its periphery on the cover plate 11 and the two plates are secured together to the flywheel 5 by the bolt 9. The support plate 10 is separated at its inner peripheral part away from the cover plate 11, and includes a step 10a protruded at near its inner peripheral end towards the cover plate 11. The step may also be a protrusion. An outer peripheral bent edge of the step 10a operates as a fulcrum point 10b that supports a mid portion of an inclined surface of the conical spring 12 facing an inner peripheral side.

The cover plate 11 is an annular member arranged on the opposite side of the flywheel 5 with respect to the support plate 10, viz., on the right side of FIG. 1, and is a component part of the limiter unit 2. The cover plate 11 is set at its outer peripheral part in contact with the support plate 10 and the two plates are secured together to the flywheel by the bolt 9. The cover plate 11 has its inner peripheral part separated away from the support plate 10. The cover plate 11 includes a hole(s) 11a for supporting the pressure plate 13 in such a manner as to prevent relative rotation and to allow for axial movement of the pressure plate 13. The pressure plate 13 includes a protrusion 13a inserted relatively non-rotatably and axially movably into the hole 11a. The cover plate 11 has a slide surface on its inner peripheral part by which the cover plate is slidably pressed on the friction member 16.

The conical spring 12 is a continuous saucer-shaped spring arranged between the support plate 10 and the pressure plate 13, and is a component part of the limiter unit 2. The conical spring 12 biases the pressure plate 13 towards the friction material 15. An inner peripheral end of the conical spring 12 abuts against the pressure plate 13, and the mid part of an inclined surface of the conical spring 12, facing an inner peripheral side, abuts against the fulcrum point 10b of the step 10a of the support plate 10. An outer peripheral end of the conical spring 12 is spaced apart from the support plate 10. The conical spring 12 operates for pressuring the pressure plate 13 under assistance by the leverage action about the fulcrum point 10b. This amplifies the thrust load of the conical spring 12 against the pressure plate 13 to allow reducing the plate thickness of the conical spring 12.

The pressure plate 13 is an annular member arranged between the conical spring 12 and the friction material 15, and is a component part of the limiter unit 2. The pressure plate 13 includes a protrusion 13a operative to prevent relative rotation and to allow for axial movement of the pressure plate 13 relative to the cover plate 11. The protrusion 13a is introduced through the hole 11a of the cover plate 11 so that the protrusion is unable to perform relative rotation but may perform axial movement. The pressure plate 13 is biased towards the friction material 15 by the conical spring 12 and is slidably pressed on its slide surface against the friction material 15.

The lining plate 14 is an annular member arranged between the friction materials 15, 16, which in turn are arranged between the cover plate 11 and the pressure plate 13. The lining plate is a component part of the limiter unit 2. An inner peripheral part of the lining plate 14 is sandwiched between the side plates 17 and 18, and is secured to the side plates 17, 18 by rivet 19. An outer peripheral part of the lining plate 14 is secured to the friction materials 15, 16 by a rivet or an adhesive, not shown.

The friction material 15 is a component part of the limiter unit 2, and is arranged between the lining plate 14 and the pressure plate 13. The friction material 15 is secured to the lining plate 14 by a rivet or an adhesive, not shown. The friction material 15 is slidably pressed on the pressure plate 13. The friction material 15 used may include rubber, resins, fibers (short fibers or long fibers) or particles for adjusting the frictional coefficient μ.

The friction material 16 is a component part of the limiter unit 2, and is arranged between the lining plate 14 and the cover plate 11. The friction material 16 is secured to the lining plate 14 by a rivet or an adhesive, not shown, and is slidably pressed on the cover plate 11.

The side plate 17 is an annular member arranged on an engine side of a flange part 25b of the hub member 25, viz., on the left side of FIG. 1, and is a component part of the damper unit 3 and the hysteresis unit 4. The side plate 17 is secured in the vicinity of an outer peripheral part thereof as one to the lining plate 14 and with the side plate 18 by the rivet 19. In the damper unit 3, located in an intermediate area, the side plate 17 includes a window 17a in which a coil spring 20 and a seat member 21 are accommodated. The peripheral end face of the window 17a may be contacted with or separated away from the seat member 21. The side plate 17 is slidably contacted with the first thrust member 22 in the hysteresis unit 4 which is located radially more inwardly than the damper unit 3. The side plate 17 has its inner peripheral end part carried by a hub member 25 (hub part 25a) for relative rotational movement via the thrust member 22.

The side plate 18 is an annular member arranged on a transmission side of the flange part 25b of the hub member 25, viz., on the right side of FIG. 1, and is a component part of the damper unit 3 and the hysteresis unit 4. The side plate 18 is secured in the vicinity of an outer peripheral end part thereof by the rivet 19 as one to the liming plate 14 and the side plate 17. In the damper unit 3 in an intermediate area, the side plate 18 includes a window 18a in which the coil spring 20 and the seat member 21 are accommodated. The peripheral end face of the window 18a may be contacted with or separated away from the seat member 21. The side plate 18 carries the conical spring 24 in the hysteresis unit 4 which is located radially more inwardly than the damper unit 2. The side plate 18 has its inner peripheral part carried by the hub member 25 (hub part 25a) for relative rotational movement via the thrust member 23.

The rivet 19 is used for securing the liming plate 14, the side plate 17 and the side plate 18 together.

The coil spring 20, a component part of the damper unit 3, is accommodated within the window parts 17a, 18a and 25c, formed in the side plates 17, 18 and in the hub member 25, respectively, and is contacted with the seat member 21 arranged on both ends. When the side plates 17, 18 and the hub member 25 perform relative rotational movement, the coil spring 20 is contracted to absorb the shock caused by differential rotations of the side plates 17, 18 and the hub member 25. The coil spring 20 may be straight-shaped, or may be bent from the straight shape, with the bent parts being then put together. To allow for broad torsion, an arc spring, bent along a peripheral direction, may also be used.

The seat member 21, a component part of the damper unit 3, is accommodated within the window parts 17a, 18a and 25c formed respectively in the side plates 17, 18 and the hub member 25 (flange part 25b). The seat member is arranged between the peripheral end faces of the window parts 17a, 18a and 25c and the end of the coil spring 20. To reduce the wear caused to the coil spring 20, the seat member 21 may be formed of resin.

The thrust member 22, a component part of the hysteresis unit 4, is an annular member arranged between the side plate 17 and the hub member 25. When seen in the axial direction, the thrust member 22 is arranged between the side plate 17 and the flange part 25b, and is slidably pressed on the side plate 17 and the flange part 25b. The thrust member 22 is also located in the radial direction between the side plate 17 and the hub part 25a, and operates as a slide bearing (bush) configured for carrying the side plate 17 for rotation relative to the hub part 25a.

The thrust member 23, a component part of the hysteresis unit 4, is an annular member arranged between the side plate 18 and the hub member 25. When seen in the axial direction, the thrust member 23 is arranged between a conical spring 24 and the flange part 25b, and is biased by the conical spring 24 towards the flange part 25b into slidably pressed on the flange part 25b. When seen in the radial direction, the thrust member 23 is located between the side plate 18 and the hub member 25a, and operates as a slide bearing (bush) for carrying the side plate 18 for rotation relative to the hub part 25a.

The conical spring 24, a component part of the hysteresis unit 4, is arranged between the thrust member 23 and the side plate 18. It is a saucer-shaped spring that biases the second thrust member 23 towards the flange part 25b.

The hub member 25, a component part of the damper unit 3 and the hysteresis unit 4, outputs the power of rotation from the damper unit 3 and the hysteresis unit 4 to the transmission. The hub member 25 includes the flange part 25b extended from a preset outer peripheral site of the hub part 25a. An inner peripheral side of the hub part 25a is in splined engagement with the transmission side rotational shaft 7. An outer peripheral part of the hub part 25a carries the side plate 17 for relative rotational movement via the thrust member 22, while carrying the side plate 18 for relative rotational movement via the thrust member 23. In the outer peripheral damper unit 3, the flange part 25b includes the window 25c in which the coil sprig 20 and the seat member 21 are accommodated. The peripheral end face of the window 25c is adapted to be contacted with or separated from the seat member 21. In the hysteresis unit 4, located more radially inwardly than the damper unit 3, the axially extending surface of the flange part 25b is slidably sandwiched between the slide members 22, 23.

Meanwhile, FIG. 1 shows a torque fluctuation absorber composed of the damper unit, hysteresis unit and the limiter unit. The torque fluctuation absorber may, however, include solely the limiter unit.

In Example 1, the thrust load of the conical spring 12 against the pressure plate 13 is amplified by the action of leverage about the fulcrum point 10b of the support plate 10, and hence the plate thickness of the conical spring 12 may be reduced. Hence, the amount of expensive spring steel to be in use may be reduced, thus decreasing the cost of the entire device.

Example 2

Figure 3:
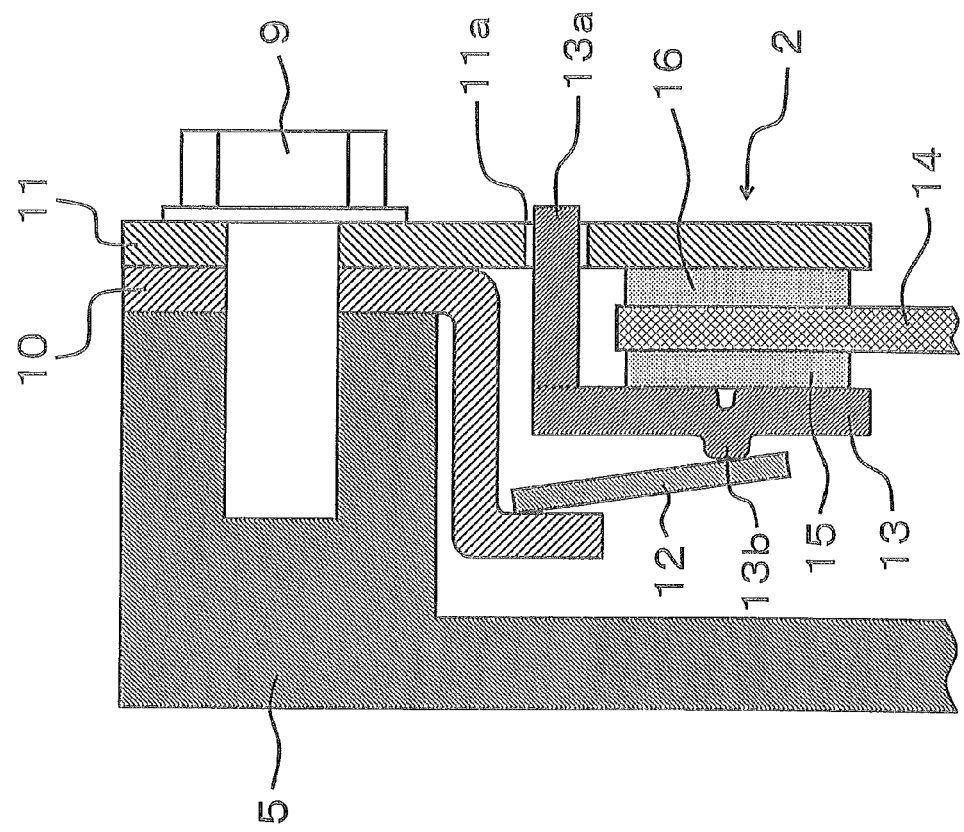
FIG. 3 is an enlarged radial partial cross-sectional view schematically showing the structure of a limiter unit in a torque fluctuation absorber according to Example 2 of the present disclosure.

A torque fluctuation absorber according to Example 2 of the present disclosure will now be described with reference to the drawings. FIG. 3 depicts an enlarged partial radial cross-sectional view schematically showing the structure of a limiter unit in the torque fluctuation absorber according to Example 2 of the present disclosure.

Example 2 is a modification of Example 1 (see FIG. 2), in which the step (10a of FIG. 2) and the fulcrum point (10b of FIG. 2) are dispensed with and a fulcrum point for the conical spring 12 is provided on the pressure plate (13 of FIG. 2). An outer peripheral end of the conical spring 12 abuts against the support plate 10. A mid part of an inclined surface of the conical spring 12, facing an outer peripheral side, abuts against a circumferential protrusion 13b of the pressure plate 13. An inner peripheral end of the conical spring 12 is spaced apart from the pressure plate 13. The circumferential protrusion 13b is provided at a mid part of the pressure plate 13 for extending towards the support plate 10. The foremost part of the circumferential protrusion 13b acts as a fulcrum point that supports the mid part of the inclined surface of the conical spring 12 facing an outer rim part of the conical spring 12. In other respects, the present Example is similar to Example 1.

In Example 2, the thrust load of the conical spring 12 against the pressure plate 13 may be amplified by the action of leverage about the circumferential protrusion 13b of the pressure plate 13, as a fulcrum point, thus allowing the plate thickness of the conical spring 12 to be reduced. Hence, the amount of expensive spring steel to be in use may be reduced, thus decreasing the cost of the entire device.

Example 3

Figure 4:
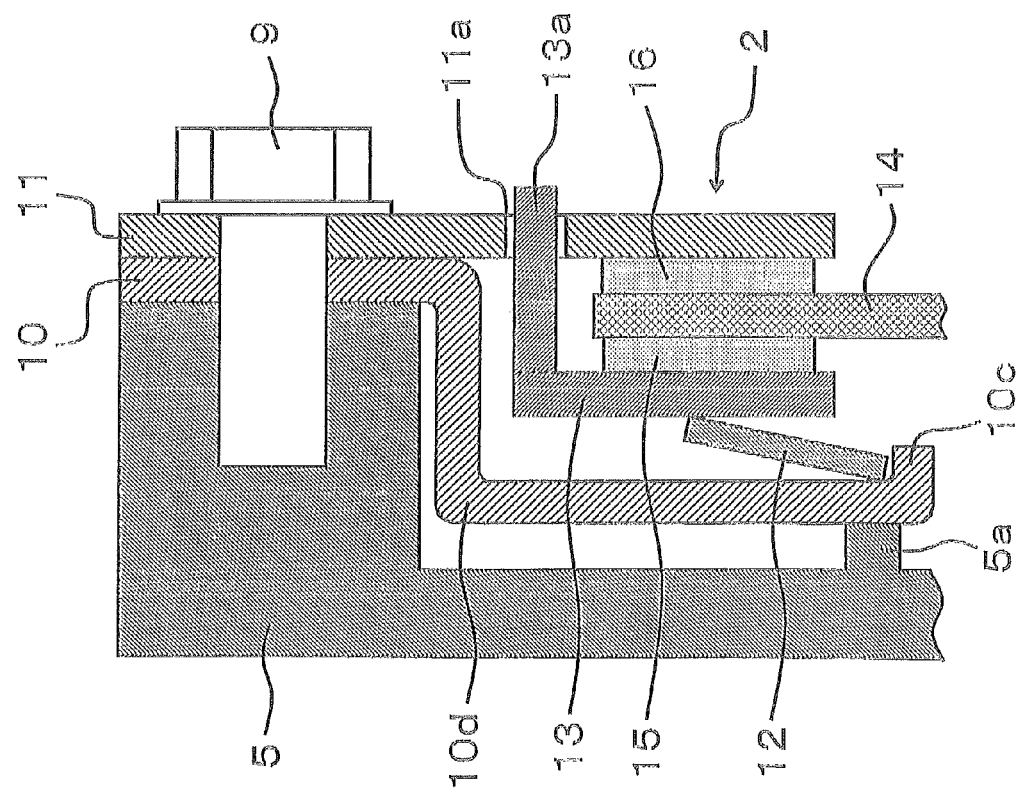
FIG. 4 is an enlarged radial partial cross-sectional view schematically showing the structure of the limiter unit in the torque fluctuation absorber according to Example 2 of the present disclosure.
Figure 5:
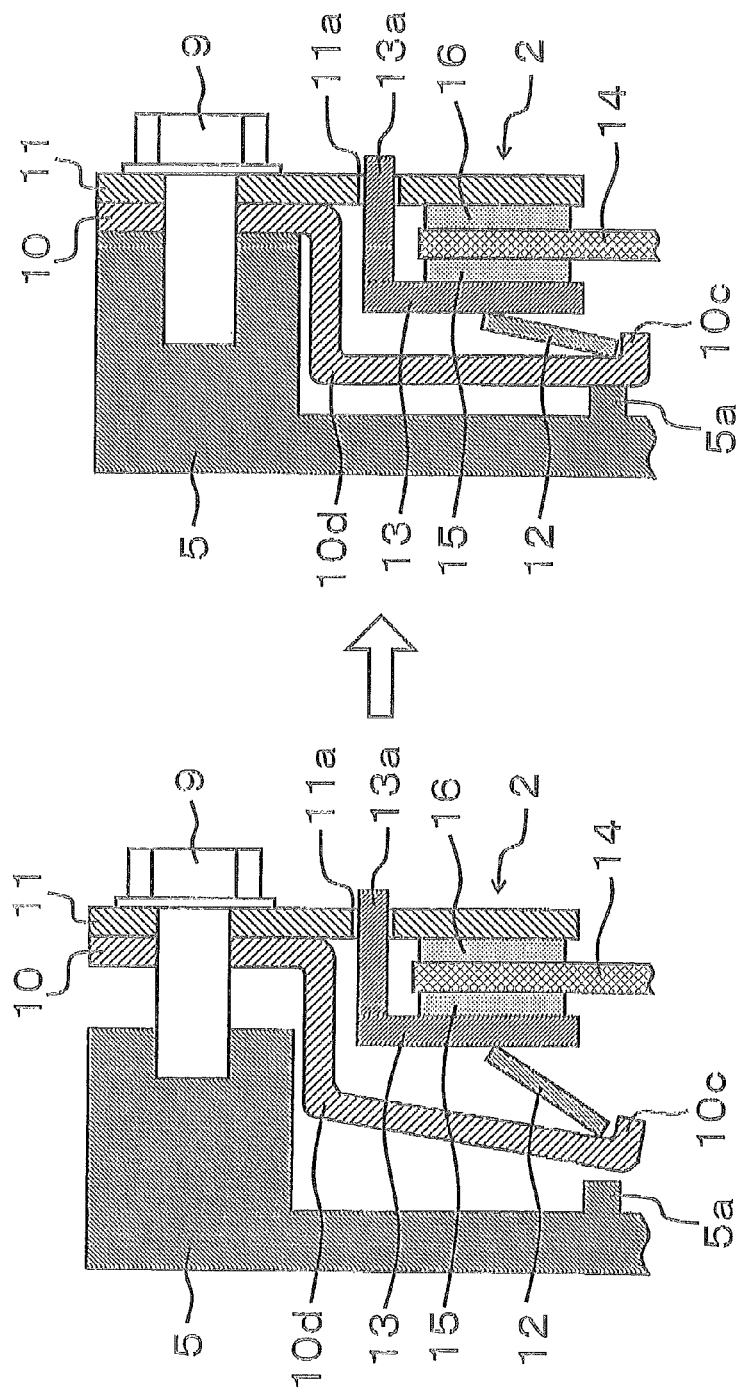
FIG. 5 left and right are enlarged radial partial cross-sectional views schematically showing the structure of a limiter unit in a torque fluctuation absorber according to Example 3 of the present disclosure, and showing the limiter unit before and after assemblage to a flywheel, respectively.

A torque fluctuation absorber according to Example 3 of the present disclosure will now be described with reference to the drawings. FIG. 4 depicts an enlarged partial radial cross-sectional view schematically showing the structure of a limiter unit in a torque fluctuation absorber according to Example 3 of the present disclosure. FIG. 5 left and FIG. 5 right depict enlarged radial partial cross-sectional views showing the structure of the limiter unit of the torque fluctuation absorber of Example 3 of the present disclosure before and after assembling on the flywheel, respectively.

In Example 3, both the diameter and the plate thickness of the conical spring (12 of FIGS. 2 and 3) are reduced, instead of reducing only its plate thickness, as in Examples 1 and 2, thereby reducing the cost. The conical spring 12 has its inner peripheral end abutted against the support plate 10, while having its outer peripheral end abutted against the pressure plate 13, specifically, against a position in a mid portion of an opposite side surface of the pressure plate having a length equal to the radial length of the friction material 15. The support plate 10 is extended radially more inwardly than the inner periphery of the conical spring 12, and includes at its extreme inner peripheral end a guide 10c protruded towards the pressure plate 13. The guide 10c prevents the radial movement of the conical spring 12. Before assemblage to the flywheel 5, the support plate 10 has its inner peripheral extreme end tilted towards the flywheel 5. After assemblage of the support plate 10 to the flywheel 5, the support plate 10 has its flexure part 10d flexed so that its inner peripheral extreme end is thrust against a protrusion 5a of the flywheel 5 (see FIG. 5). The support plate 10 is provided with slits or bends to prevent that the flexure part 10d of the support plate is plastically deformed. The protrusion 5a of the flywheel 5 is provided at a position on an opposite side of the support plate 10 with respect to the position of abutment of the inner peripheral extreme end of the conical spring 12 against the support plate. In other respects, the present Example is similar in structure to Example 1.

In Example 3, the outer peripheral extreme end of the conical spring 12 abuts against the pressure plate 13, specifically, against a position in a mid portion of an opposite side surface of the pressure plate having a length equal to the radial length of the friction material 15. Hence, the diameter of the conical spring 12 may be reduced. The amount of use of the expensive spring steel material may thus be reduced to lower the cost of the device. Since the diameter of the conical spring 12 is reduced, the thrust load of the conical spring 12 may be increased to allow reducing the plate thickness of the conical spring 12. Since the amount of the expensive spring steel material to be in use may be reduced, the cost of the entire device may be lowered. In addition, since the support plate 10 is thrust against and supported by the flywheel 5 after assemblage thereof to the flywheel 5, it is unnecessary to increase the strength of the support plate 10. Since the plate thickness of the support plate 10 may thus be reduced, the amount of the steel material may be reduced to lower the cost of the entire device.

Example 4

Figure 6:
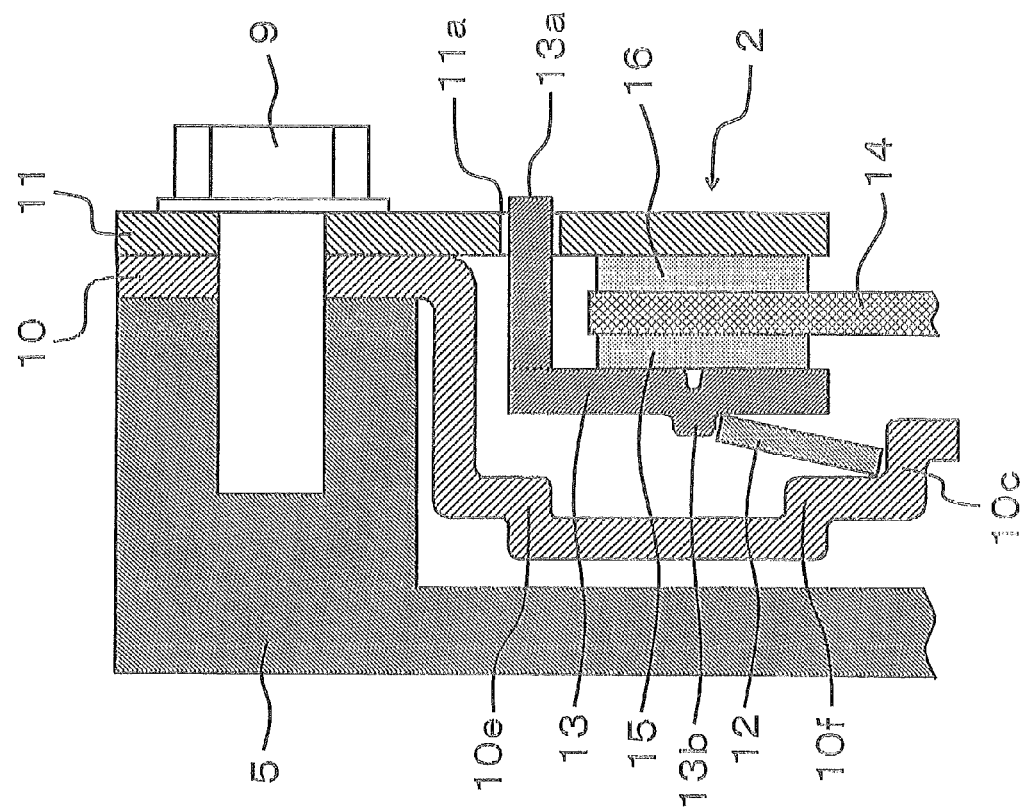
FIG. 6 is an enlarged radial partial cross-sectional view schematically showing the structure of a limiter unit in a torque fluctuation absorber according to Example 4 of the present disclosure.

A torque fluctuation absorber according to Example 4 of the present disclosure will now be described with reference to the drawings. FIG. 6 depicts an enlarged partial radial cross-sectional view schematically showing the structure of a limiter unit in the torque fluctuation absorber according to Example 4 of the present disclosure.

The Example 4 is a modification of Example 3 (see FIG. 4). In the present Example, the support plate 10 is not thrust against or carried by the flywheel 5, as in Example 3. Instead, steps 10e, 10f are provided to improve the strength of the support plate 10. The conical spring 12 has its inner peripheral extreme end abutted against the support plate 10, while having its outer peripheral extreme end abutted against the pressure plate 13, specifically, against a position in a mid portion of an opposite side surface of the pressure plate having a length equal to the mid portion of the radial length of the friction material 15. The support plate 10 is extended more radially inwardly than the conical spring 12, and has a guide 10c at its inner peripheral extreme end. The guide 10c is protruded towards the pressure plate 13 to prevent radial movement of the conical spring 12. The support plate 10 is provided with the steps 10e, 10f at its mid portion which supports the conical spring 12 and which is thus liable to become deformed. The function of the steps 10e, 10f is to reduce flexure of the support plate 10 in the axial direction. In FIG. 6, the support plate 10 is provided with the two steps 10e, 10f only by way of illustration. The steps 10e, 10f may be arrayed circumferentially in series, that is, each extending along a radial direction, not only being arrayed radially in series. The support plate 10 is not provided with slits or bends, as in Example 3. The pressure plate 13 is provided with a circumferentially extending protrusion 13b which is located radially more outwardly than the abutment surface thereof with the outer peripheral extreme end of the conical spring 12. The circumferentially protrusion 13b prevents radial movement of the conical spring 12. In other respects, the present Example is similar to Example 1.

In Example 4, the outer peripheral extreme end of the conical spring 12 abuts against the pressure plate 13, specifically, against a position in a mid portion of an opposite side surface of the pressure plate having a length equal to the mid portion of the radial length of the friction material 15. Hence, the diameter of the conical spring 12 may be reduced. Since the amount of the expensive spring steel material to be in use may be reduced, the cost of the entire device may be lowered. In addition, since the diameter of the conical spring 12 is reduced, the thrust load of the conical spring 12 may be increased to allow reducing the plate thickness of the conical spring 12. Since the amount of the expensive spring steel material to be in use may be reduced, the cost of the entire device may be lowered. In addition, since the support plate 10 is provided with the steps 10e, 10f, the strength of the support plate 10 may be maintained even if the plate thickness of the support plate 10 is reduced. Since the amount of steel material may be reduced, the cost of the entire device may be reduced.

Example 5

Figure 7:
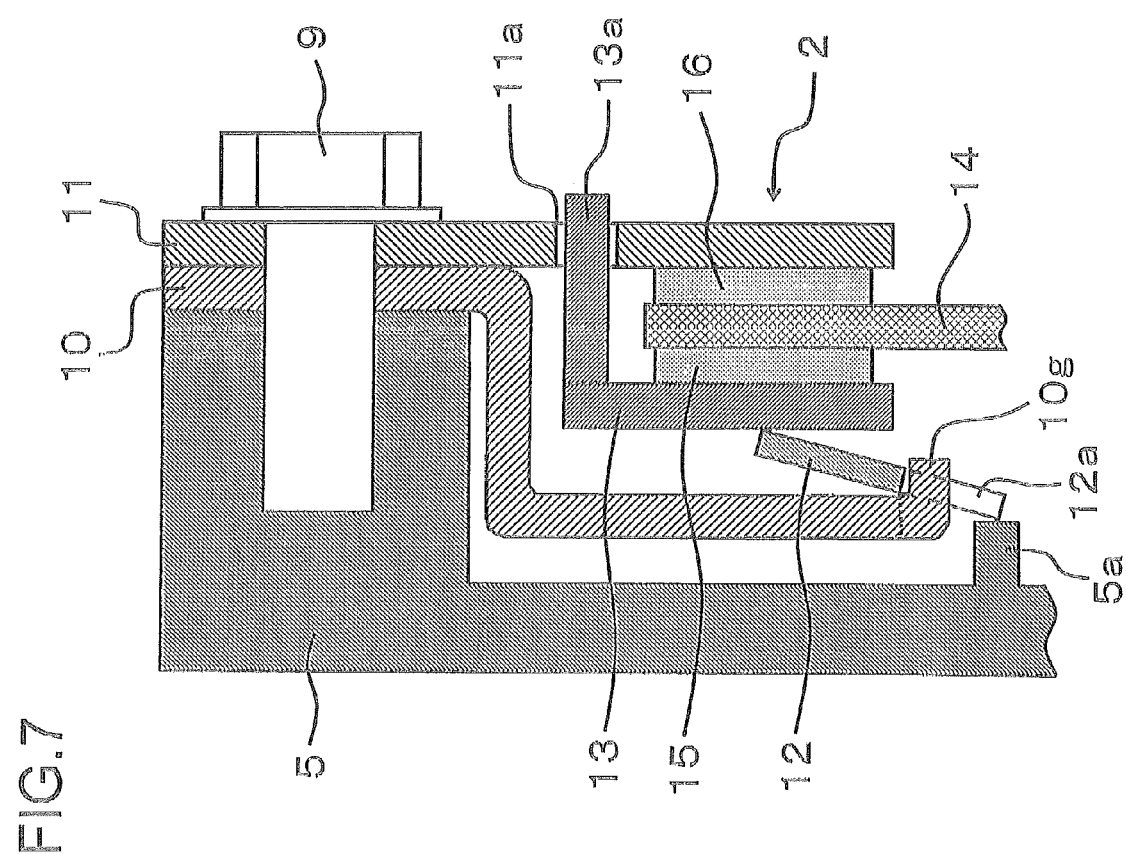
FIG. 7 is an enlarged radial partial cross-sectional view schematically showing the structure of a limiter unit in a torque fluctuation absorber according to Example 5 of the present disclosure.

A torque fluctuation absorber according to Example 5 of the present disclosure will now be described with reference to the drawings. FIG. 7 depicts an enlarged partial radial cross-sectional view schematically showing the structure of a limiter unit in a torque fluctuation absorber according to Example 5 of the present disclosure.

Example 5 is a modification of Example 3 (see FIG. 4). An inner peripheral extreme end of the conical spring 12 is provided with an abutment 12a. The abutment 12a rests on the protrusion 5a of the flywheel 5. The outer peripheral extreme end of the conical spring 12 is abutted against the pressure plate 13. The inner peripheral extreme end of the support plate 10 is provided with a plurality of rotation stops 10g. The conical spring 12 is engaged relatively non-rotatably with the rotation stops 10g of the support plate 10, and is prevented in its radial movement by these rotation stops 10g. In other respects, the present Example is similar to Example 1.

In the present Example 5, the outer peripheral extreme end of the conical spring 12 is abutted against the pressure plate 13, specifically, against a position in a mid portion of an opposite side surface of the pressure plate having a length equal to the radial length of the friction material 15. Hence, the diameter of the conical spring 12 may be reduced. Since the amount of use of the expensive spring steel material may be reduced, the cost of the device may be lowered. Moreover, since the diameter of the conical spring 12 is reduced, the thrust load of the conical spring 12 may be increased to allow the plate thickness of the conical spring 12 to be reduced. Since the amount of the expensive spring steel material to be in use may be reduced, the cost of the entire device may be lowered. In addition, since the inner peripheral extreme end of the conical spring 12 (extreme end of the rotation stop part 10a) is supported by the flywheel 5 (protrusion 5a), it is unnecessary to elevate the strength of the support plate 10, and hence the plate thickness of the support plate 10 may be reduced. Since the amount of the steel material used may be reduced, the cost of the entire device may be lowered.

Example 6

Figure 8:
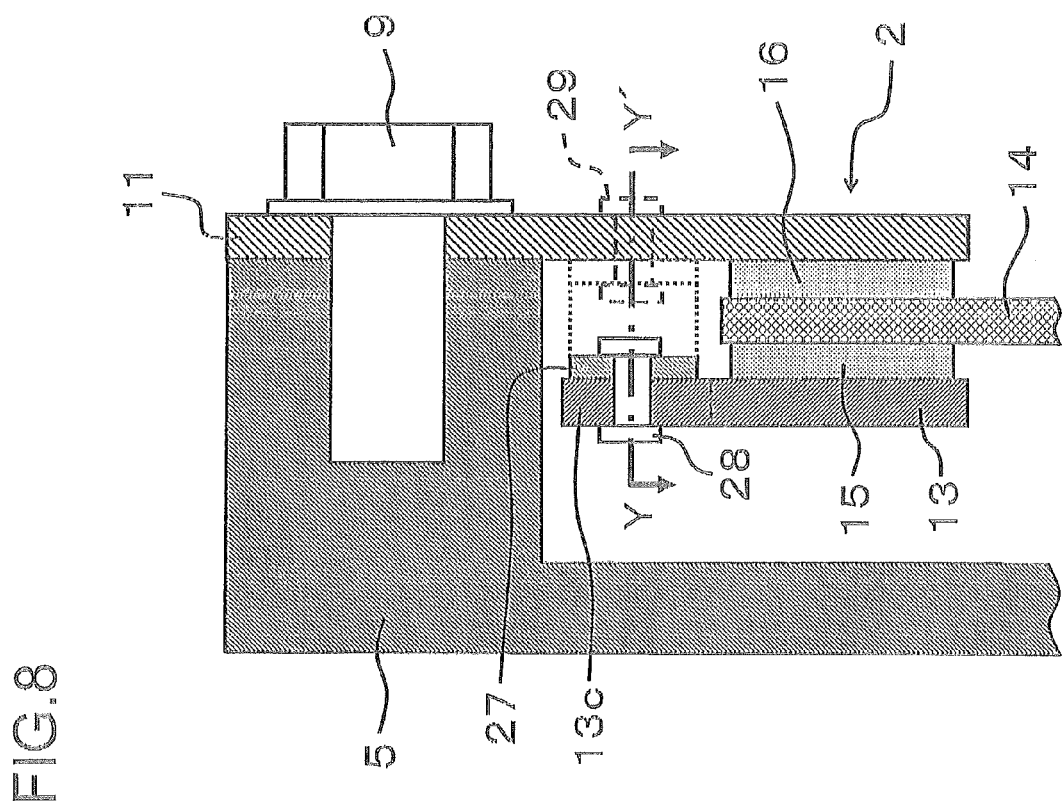
FIG. 8 is an enlarged radial partial cross-sectional view, corresponding to a cross-section taken along line X-X' of FIGS. 9 and 10, and schematically showing the structure of a limiter unit in a torque fluctuation absorber according to Example 6 of the present disclosure.
Figure 9:
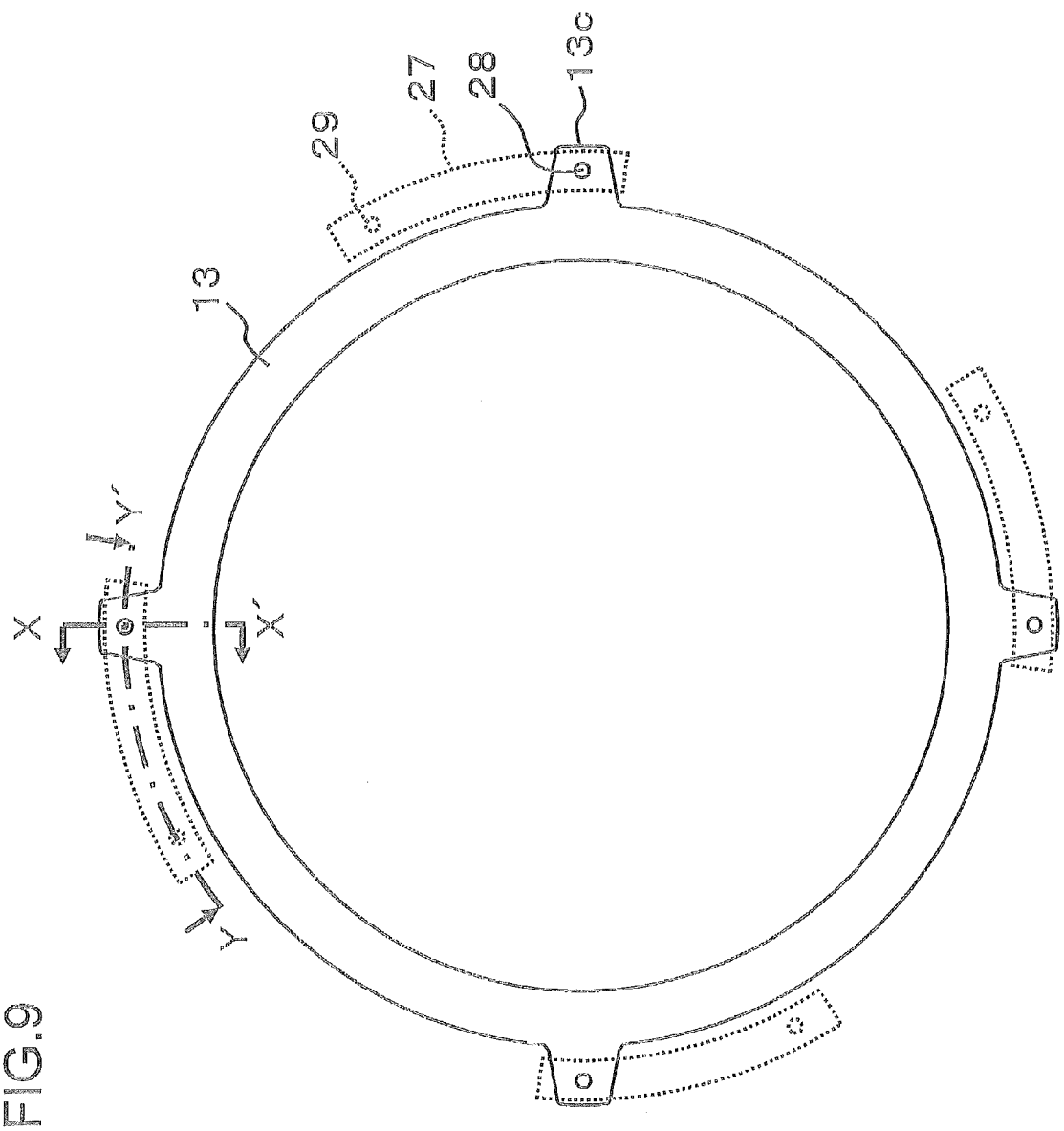
FIG. 9 is a plan view schematically showing the structure of a pressure plate of the limiter unit in the torque fluctuation absorber according to Example 6 of the present disclosure.
Figure 10:
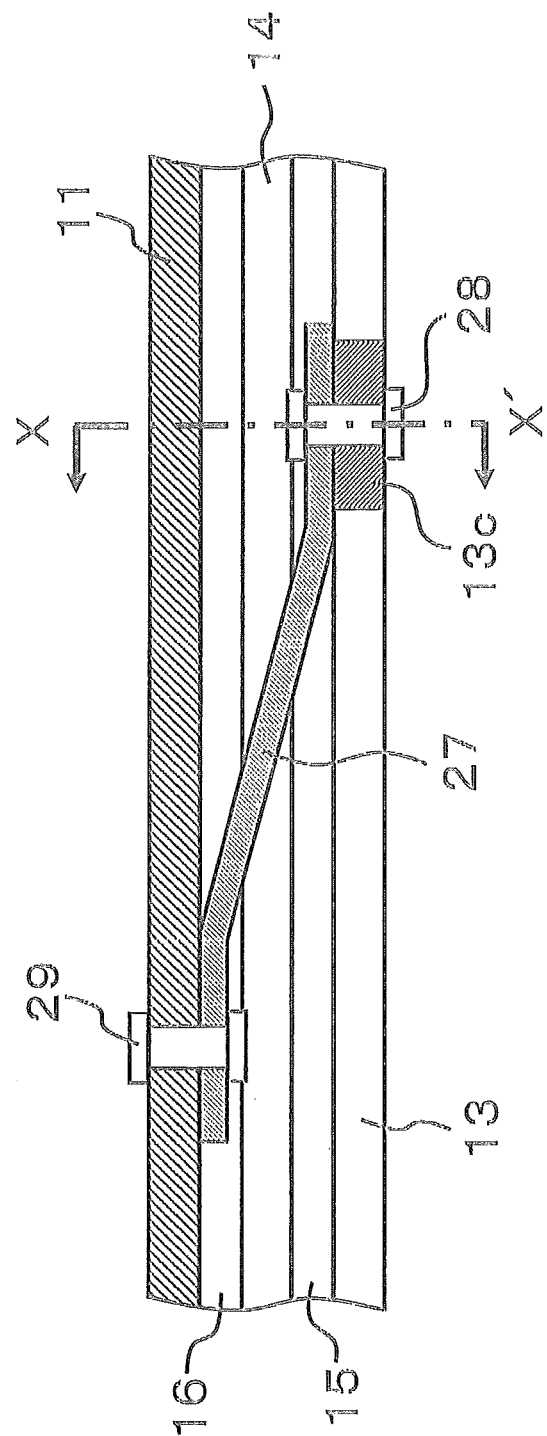
FIG. 10 is an enlarged radial partial cross-sectional view, corresponding to a cross-section taken along line Y-Y' of FIGS. 8 and 9, and schematically showing the structure of the limiter unit in the torque fluctuation absorber according to Example 6 of the present disclosure.
Figure 11:
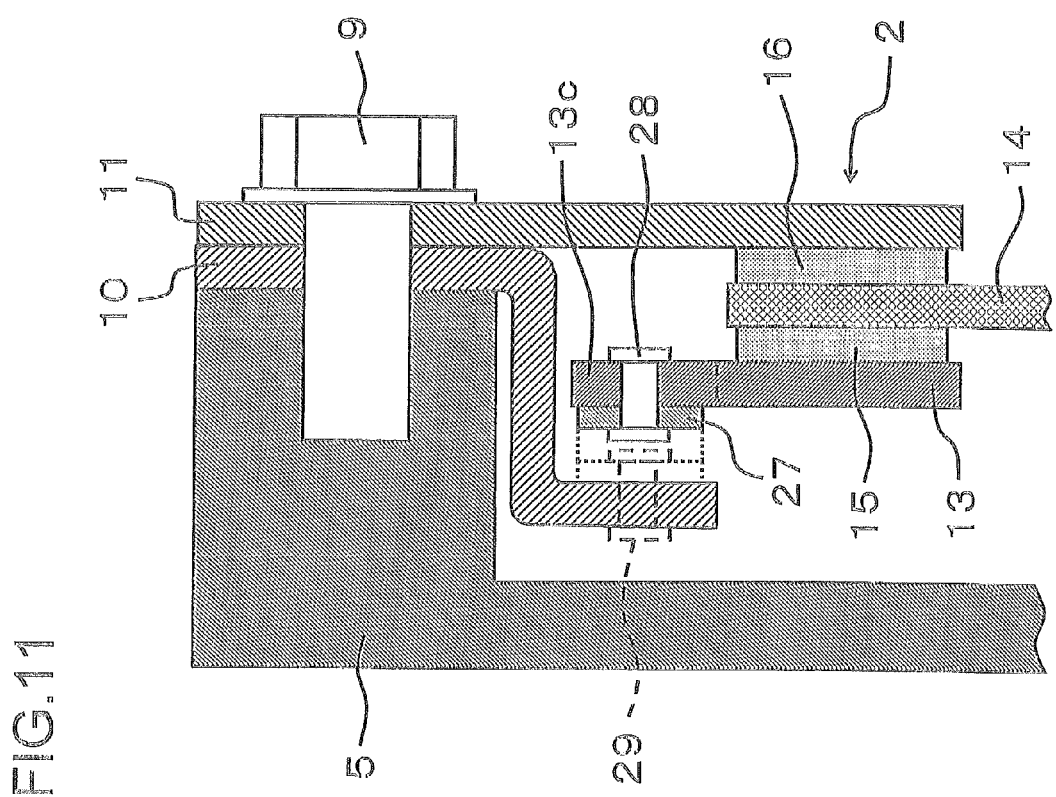
FIG. 11 is an enlarged radial partial cross-sectional view schematically showing the structure of the limiter unit in the torque fluctuation absorber according to Example 6 of the present disclosure.

A torque fluctuation absorber according to Example 6 of the present disclosure will now be described with reference to the drawings. FIG. 8 depicts an enlarged partial radial cross-sectional view (cross-section taken along lines X-X' of FIGS. 9 and 10) schematically showing the structure of a limiter unit in the torque fluctuation absorber according to Example 6 of the present disclosure. FIG. 9 depicts an enlarged partial radial cross-sectional view schematically showing the structure of a pressure plate of the limiter unit in the torque fluctuation absorber according to Example 6 of the present disclosure. FIG. 10 depicts an enlarged partial radial cross-sectional view (cross-section taken along lines Y-Y' of FIGS. 8 and 9) schematically showing the structure of the limiter unit in the torque fluctuation absorber according to Example 6 of the present disclosure. FIG. 11 depicts an enlarged partial radial cross-sectional view schematically showing the structure of the limiter unit in the torque fluctuation absorber according to Example 6 of the present disclosure.

In Example 6, the conical spring 12, used in Examples 1 to 5, is not used. Instead, a less expensive sheet spring 27 is used. Also, in Example 6, the support plate (10 of FIG. 2) is not used and, instead, the sheet spring 27 is coupled by rivets 28, 29 to the pressure plate 13 and to the cover plate 11, respectively. Otherwise, the present Example is similar to Example 1.

The cover plate 11 is an annular member fastened by the bolt 9 to the flywheel 5, and is a component part of the limiter unit 2. An inner peripheral part of the cover plate 11 is spaced apart from the support plate 10. The cover plate 11 includes an inner peripheral slide surface by which it is slidably pressed on the friction material 16. The cover plate 11 is fastened by rivet 29 to the sheet spring 27 at a portion between the site of the cover plate 11 fastened by the bolt 9 and the slide surface thereof against the friction material 16.

The pressure plate 13 is an annular member slidably pressed on the friction material 15, and is a component member of the limiter unit 2. The pressure plate 13 is provided with an outer peripheral protrusion 13c at a preset position(s) on its outer peripheral extreme end (see FIG. 9). The sheet spring 27 is fastened by rivet 28 to the outer peripheral protrusion 13c. The pressure plate 13 is biased by the sheet spring 27 towards the friction material 15.

The sheet spring 27 is arranged between the cover plate 11 and the outer peripheral protrusion 13c of the pressure plate 13, and is a component part of the limiter unit 12. The sheet spring 27 biases the pressure plate 13 towards the friction material 15. The sheet spring 27 is extended in the circumferential direction (see FIG. 9) with its mid portion traversing the outer periphery of the lining plate 14 and the friction materials 15, 16 at a spaced apart relation therefrom (see FIG. 10). The sheet spring 27 has its one end secured by rivet 28 to the outer peripheral protrusion 13e of the pressure plate 13, while having its other end secured by rivet 29 to the cover plate 11.

The rivet 28 is a member that secures the one end of the sheet spring 27 to the outer peripheral protrusion 13c of the pressure plate 13.

The rivet 29 is a member that secures the other end of the sheet spring 27 to the cover plate 11.

In FIGS. 8 to 10, the other end of the sheet spring 27 is secured to the cover plate 11. It is however also possible to provide the support plate 10 between the flywheel 5 and the cover plate 11 and to connect the sheet spring 27 via the rivets 28, 29 to the pressure plate 13 and to the support plate 10, as shown in FIG. 11.

In Example 6, in which the sheet spring 27, higher in yield than a conical spring 12, is used, the entire device may be lowered in cost. Moreover, since the sheet spring 27 has the torque transmitting function, a rotation stop mechanism that halts rotation of the pressure plate 13 relative to the cover plate 11 (protrusion 13a and the hole 11a of FIG. 2) may be dispensed with, thereby reducing the cost and the space. If the support plate (10 of FIG. 11) is not used, as in FIGS. 8 to 10, the number of component parts may be reduced to further reduce the cost.

Example 7

Figure 12:
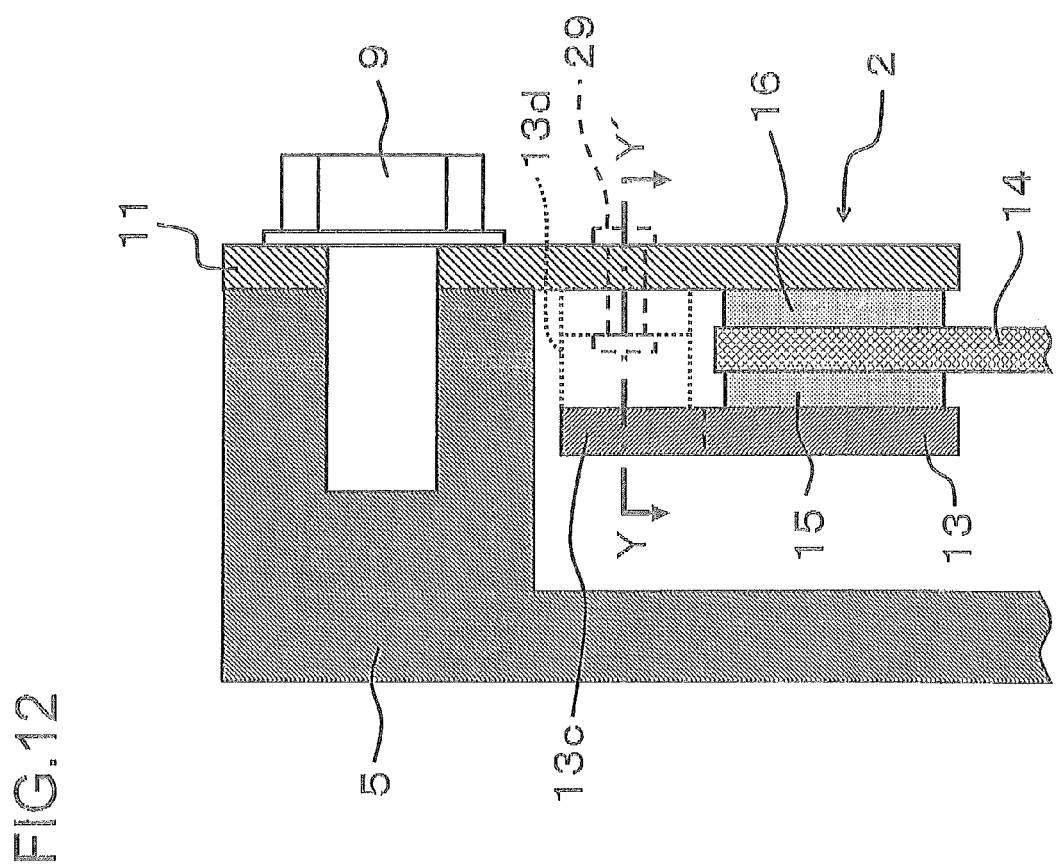
FIG. 12 is an enlarged radial partial cross-sectional view, corresponding to a cross-section taken along line X-X' of FIGS. 13 and 14, and schematically showing the structure of a limiter unit in a torque fluctuation absorber according to Example 7 of the present disclosure.
Figure 13:
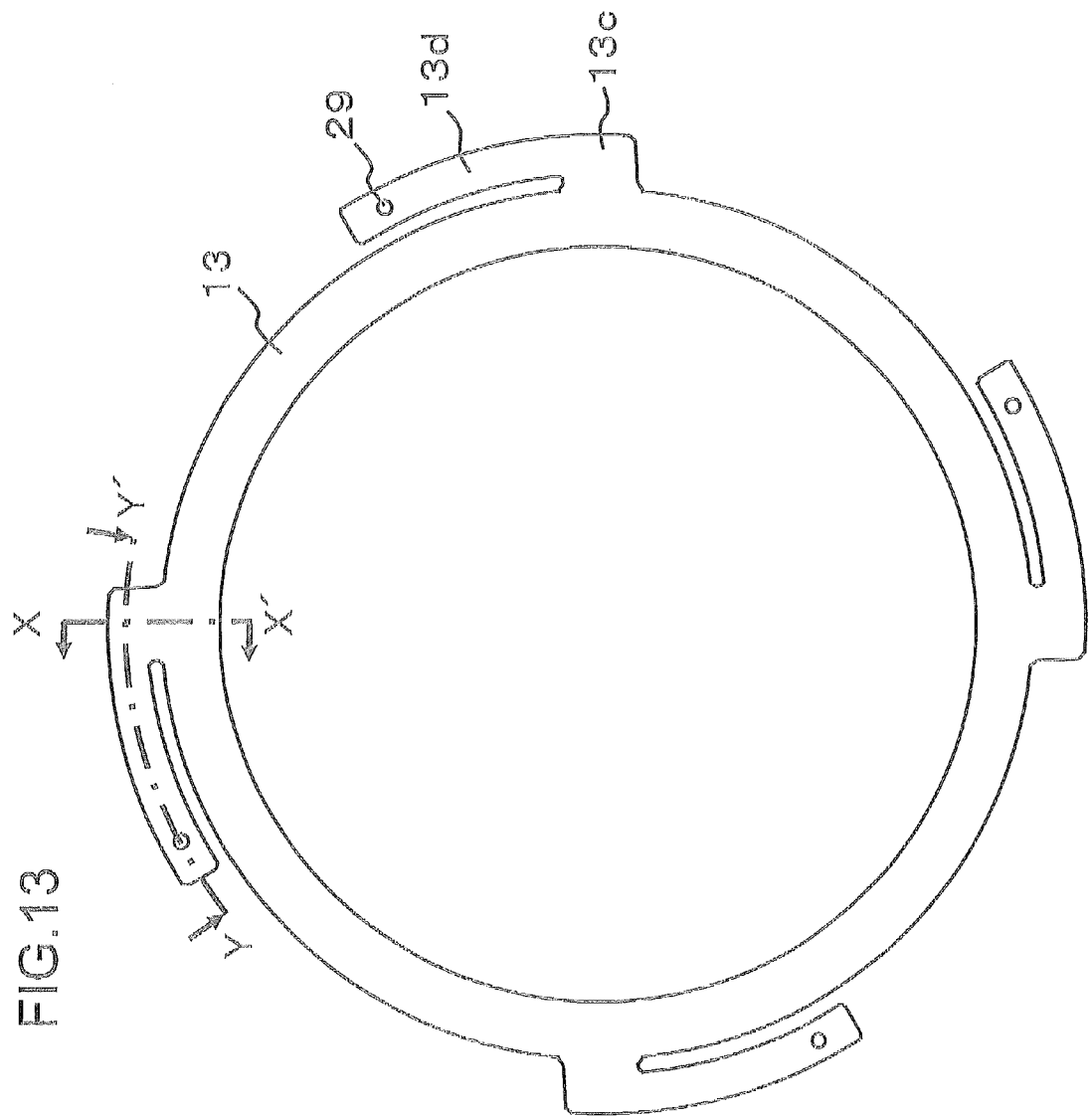
FIG. 13 is a plan view schematically showing the structure of a pressure plate of the limiter unit in a torque fluctuation absorber according to Example 7 of the present disclosure.
Figure 14:
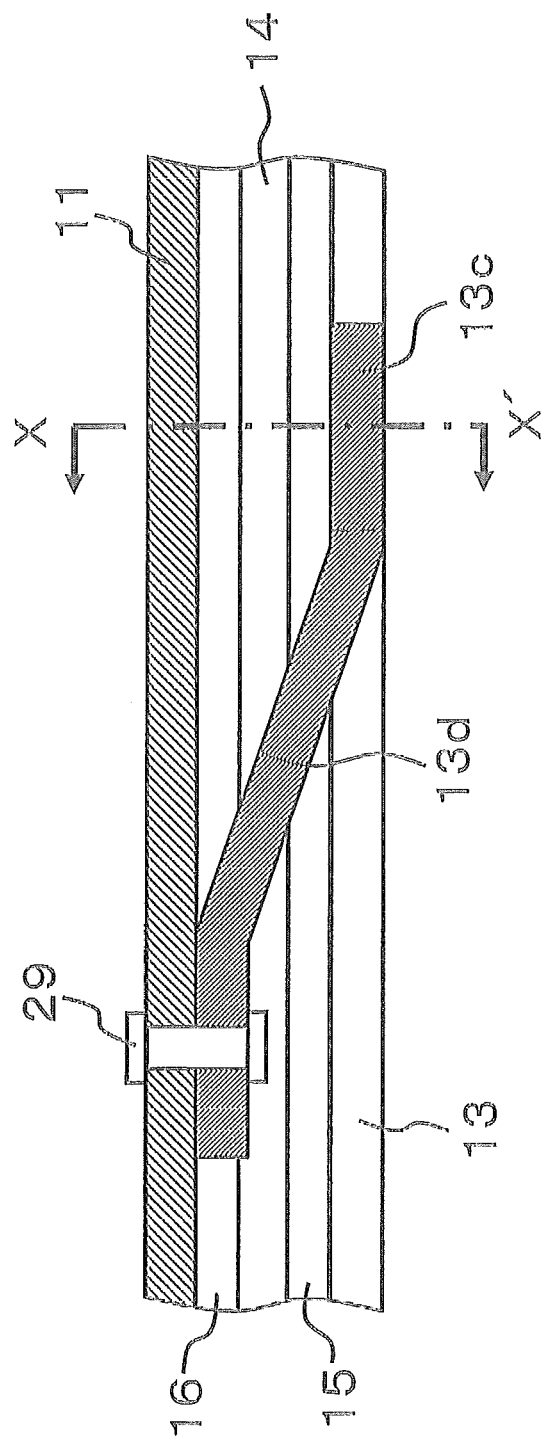
FIG. 14 is an enlarged radial partial cross-sectional view, corresponding to a cross-section taken along line Y-Y' of FIGS. 12 and 13, and schematically showing the structure of the limiter unit in the torque fluctuation absorber according to Example 7 of the present disclosure.

A torque fluctuation absorber according to Example 7 of the present disclosure will now be described with reference to the drawings. FIG. 12 depicts an enlarged partial radial cross-sectional view (cross-section taken along lines X-X' of FIGS. 13 and 14) schematically showing the structure of a limiter unit in the torque fluctuation absorber according to Example 7 of the present disclosure. FIG. 13 depicts a plan view schematically showing the structure of a pressure plate of the limiter unit in the torque fluctuation absorber according to Example 7. FIG. 14 depicts an enlarged partial radial cross-sectional view (cross-section taken along lines Y-Y' of FIGS. 12 and 13) schematically showing the structure of the limiter unit in the torque fluctuation absorber according to Example 7.

Example 7 is a modification of Example 6 (see FIGS. 8 to 10). In the present Example 7, the sheet spring (27 of FIG. 9) and the rivet (28 of FIG. 9) in Example 6 are unified to the pressure plate 13. In other respects, the present Example is similar to Example 6.

The pressure plate 13 is a member slidably pressed on the friction material 15, and is a component member of the limiter unit 2. The pressure plate 13 includes a plurality of the outer peripheral protrusions 13c at preset outer peripheral positions (see FIG. 13). Each outer peripheral protrusion 13c includes a circumferential extension 13d along its outer periphery. The circumferential extension 13d acts as a sheet (plate) spring to bias the main part of the pressure plate 13 towards the friction material 15. The circumferential extension 13d traverses the outer periphery of the liming plate 14 and the friction materials 15, 16 at a spaced apart relation therefrom (see FIG. 14), and has its foremost part secured to the cover plate 11 by the rivet 29.

In FIGS. 12 to 14, the foremost part of the circumferential extension 13d of the pressure plate 13 is secured to the cover plate 11. It is however also possible to provide the support plate 10 between the flywheel 5 and the cover plate 11, and to connect the foremost part of the circumferential extension 13d of the pressure plate 13 to the support plate 10.

In the present Example 7, in which the pressure plate 13 has the function of the sheet spring, it is possible to reduce the number of component parts and hence the cost. Moreover, since the circumferential extension 13d of the pressure plate 13 has the torque transmitting function, the rotation stop system of halting the rotation of the pressure plate 13 with respect to the cover plate 11 (protrusion 13a and the hole 11a of FIG. 2) may be dispensed with. Hence, the cost as well as the space may be reduced. If the support plate (10 of FIG. 11) is not used, as in FIGS. 12 to 14, the number of component parts may be reduced to further reduce the cost.

Example 8

Figure 15:
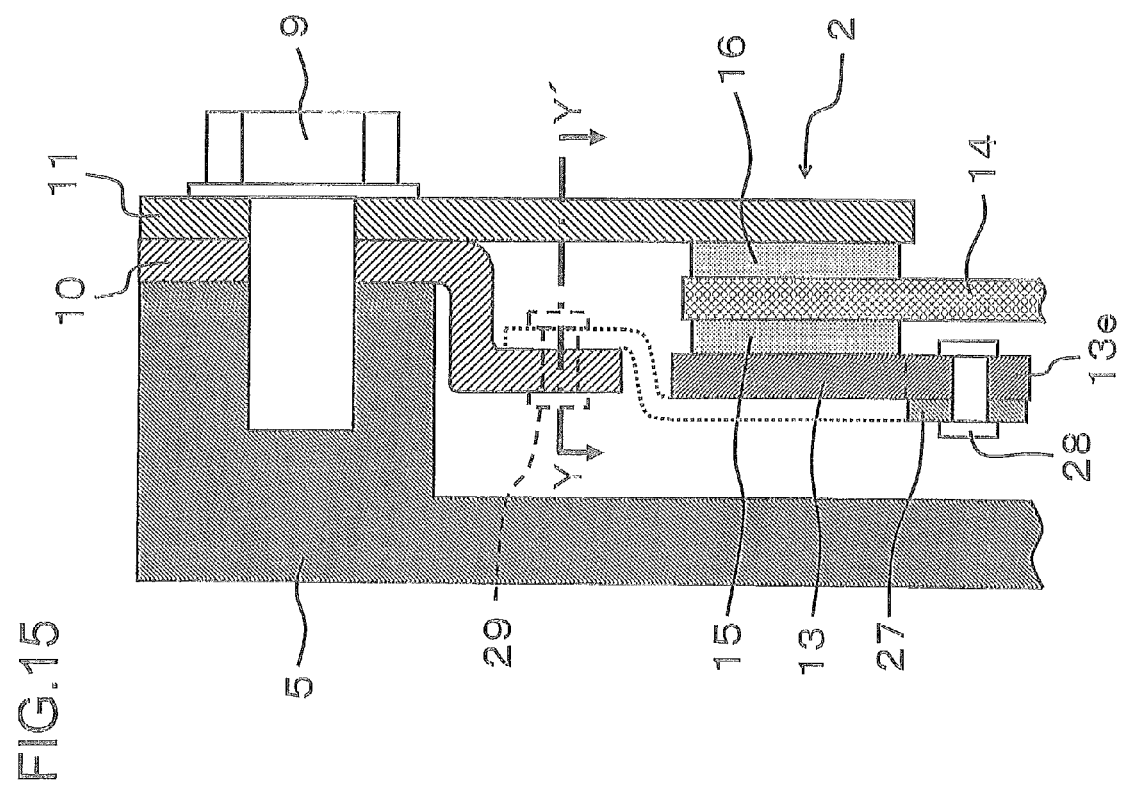
FIG. 15 is an enlarged radial partial cross-sectional view, corresponding to a cross-section taken along line X-X' of FIGS. 16 and 17, and schematically showing the structure of a limiter unit in a torque fluctuation absorber according to Example 8 of the present disclosure.
Figure 16:
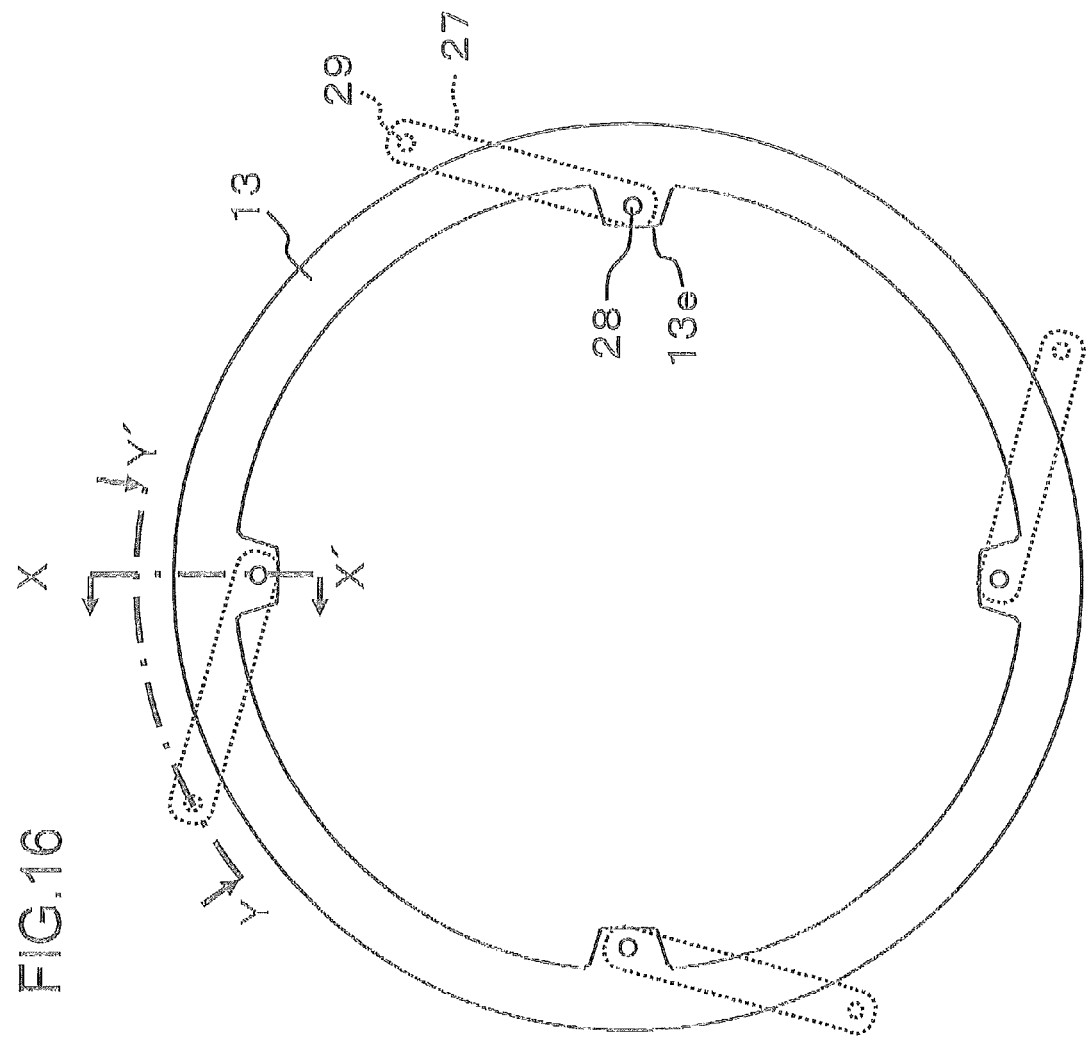
FIG. 16 is a plan view schematically showing the structure of a pressure plate of the limiter unit in the torque fluctuation absorber according to Example 8 of the present disclosure.
Figure 17:
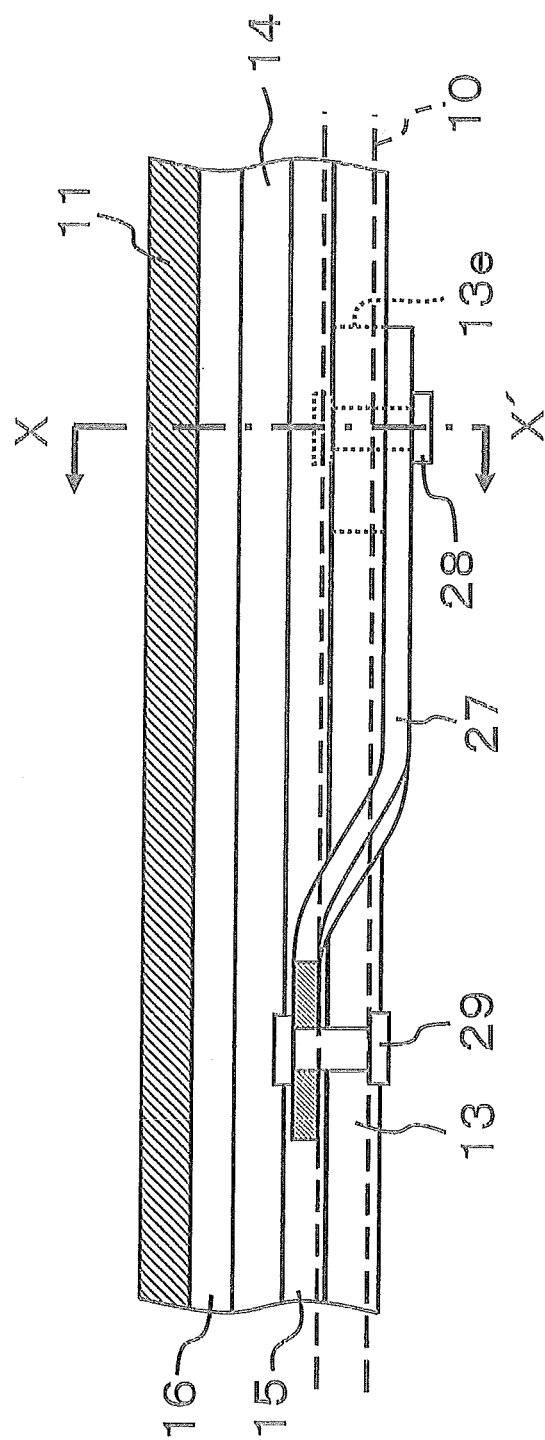
FIG. 17 is an enlarged radial partial cross-sectional view, corresponding to a cross-section taken along line Y-Y' of FIGS. 15 and 16, and schematically showing the structure of the limiter unit in the torque fluctuation absorber according to Example 8 of the present disclosure.

A torque fluctuation absorber according to Example 8 of the present disclosure will now be described with reference to the drawings. FIG. 15 depicts an enlarged partial radial cross-sectional view (cross-section taken along lines X-X' of FIGS. 16 and 17) schematically showing the structure of a limiter unit in the torque fluctuation absorber according to Example 8 of the present disclosure. FIG. 16 depicts a plan view schematically showing the structure of a pressure plate of the limiter unit in the torque fluctuation absorber according to Example 8 of the present disclosure. FIG. 17 depicts an enlarged partial radial cross-sectional view (cross-section taken along lines Y-Y' of FIGS. 15 and 16) schematically showing the structure of the limiter unit in the torque fluctuation absorber according to Example 8.

Example 8 is a modification of Example 6 (modification shown in FIG. 11). In the present Example, the sheet spring 27 is connected to the pressure plate 13 at a location located radially more inwardly than the slide surface of the pressure plate 13 with respect to the friction material 15. In other respects, the present Example is similar to Example 6 (modification).

The pressure plate 13 is an annular member slidably pressed on the friction material 15, and is a component part of the limiter unit 2. The pressure plate 13 includes a plurality of inner peripheral protrusions 13e at preset inner peripheral end positions (see FIG. 16). These inner peripheral protrusions 13e are secured by rivets 28 to the sheet spring 27. The pressure plate 13 is biased by the sheet spring 27 towards the friction material 15.

The sheet spring 27 is provided between the support plate 10 and the outer peripheral protrusion 13c of the pressure plate 13, and is a component part of the limiter unit 2. The sheet spring 27 biases the pressure plate 13 towards the friction material 15. A mid area of the sheet spring 27 traverses the outer rim of the pressure plate 13 (see FIG. 16) in a spaced apart relationship therefrom (see FIG. 17). The sheet spring 27 has its one end secured by the rivet 28 to the inner peripheral protrusion 13e of the pressure plate 13, while having its other end secured by the rivet 29 to a surface of the support plate 10 facing the cover plate 11.

In Example 8, in which the sheet spring 27, higher in yield than a conical spring 12, is used, the entire device may be lowered in cost. Moreover, since the sheet spring 27 has a torque transmitting function, the rotation stop mechanism that halts the rotation of the pressure plate 13 relative to the cover plate 11 (protrusion 13a and the hole 11a of FIG. 2) may be dispensed with, thereby reducing the cost and the space. In addition, the site of connection of the sheet spring 27 to the pressure plate 13 is located radially more inwardly than the slide surface of the pressure plate 13 relative to the friction material 15, and hence the pressure plate 13 may be reduced in diameter. The amount of steel material to be in use may thus be reduced, thereby further reducing the cost and the space.

Example 9

Figure 18:
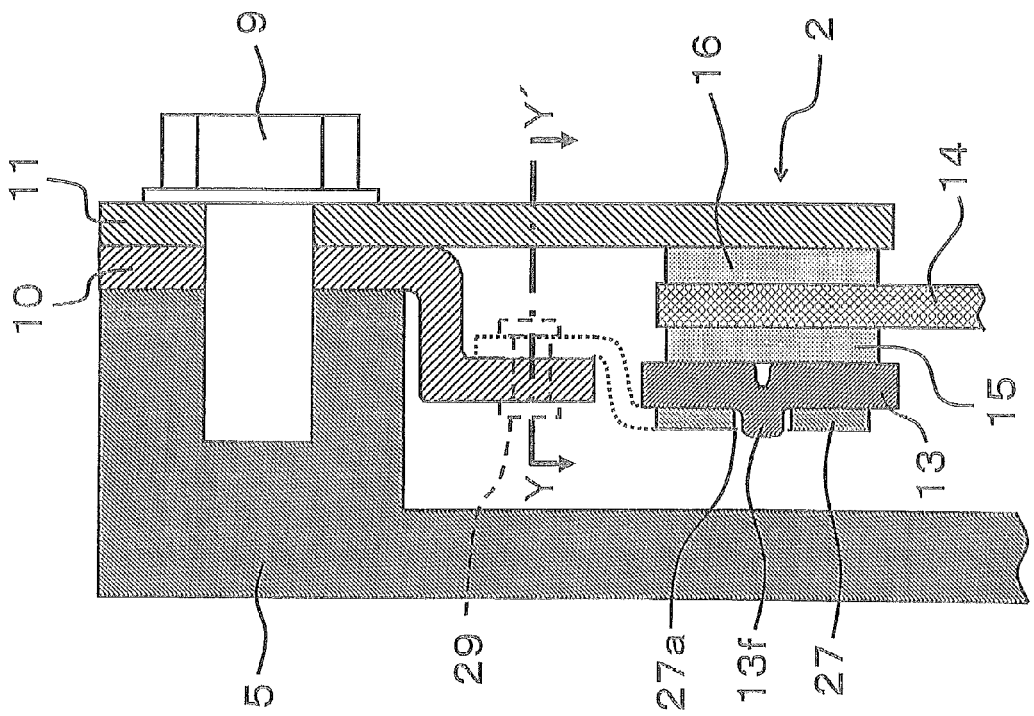
FIG. 18 is an enlarged radial partial cross-sectional view, corresponding to a cross-section taken along line X-X' of FIGS. 19 and 20, and schematically showing the structure of a limiter unit in a torque fluctuation absorber according to Example 9 of the present disclosure.
Figure 19:
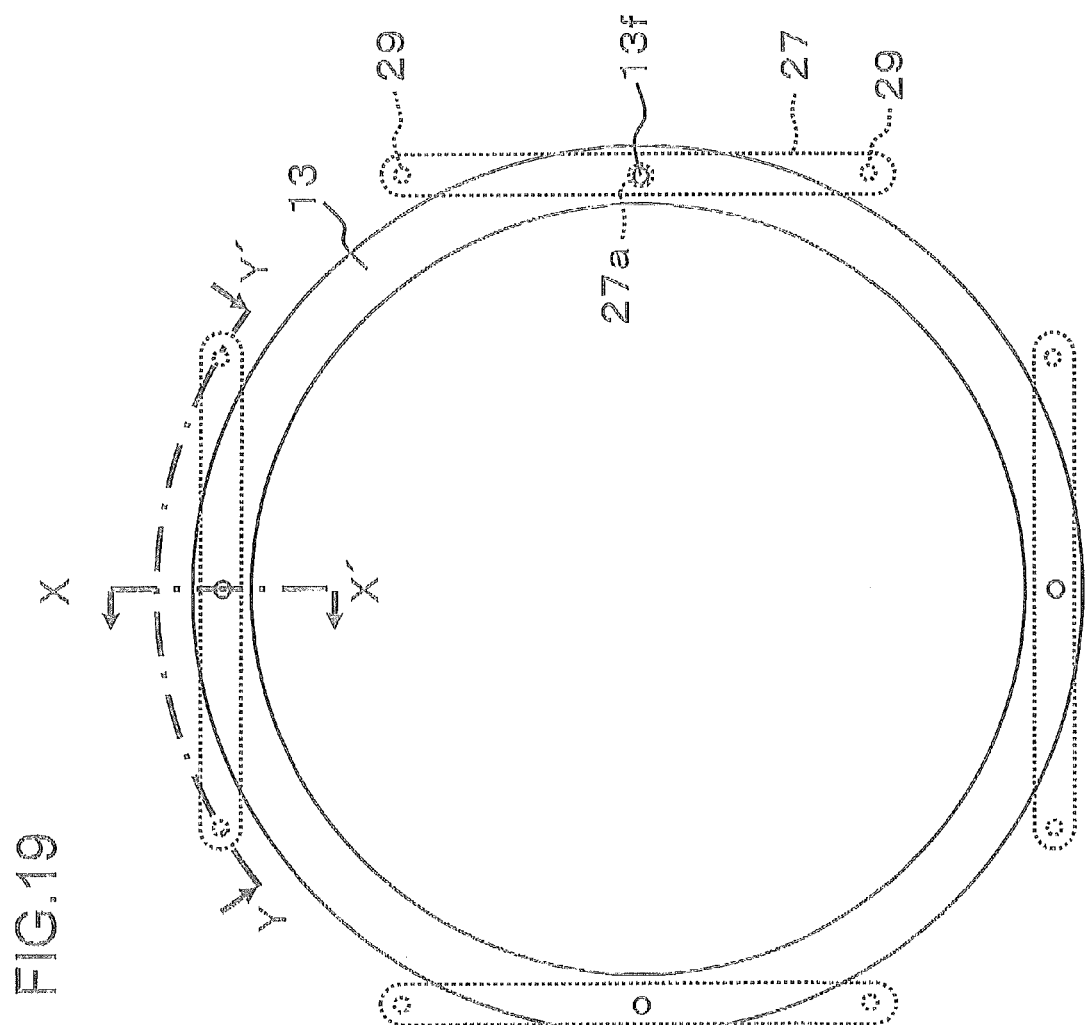
FIG. 19 is a plan view schematically showing the structure of a pressure plate of the limiter unit in the torque fluctuation absorber according to Example 9 of the present disclosure.
Figure 20:
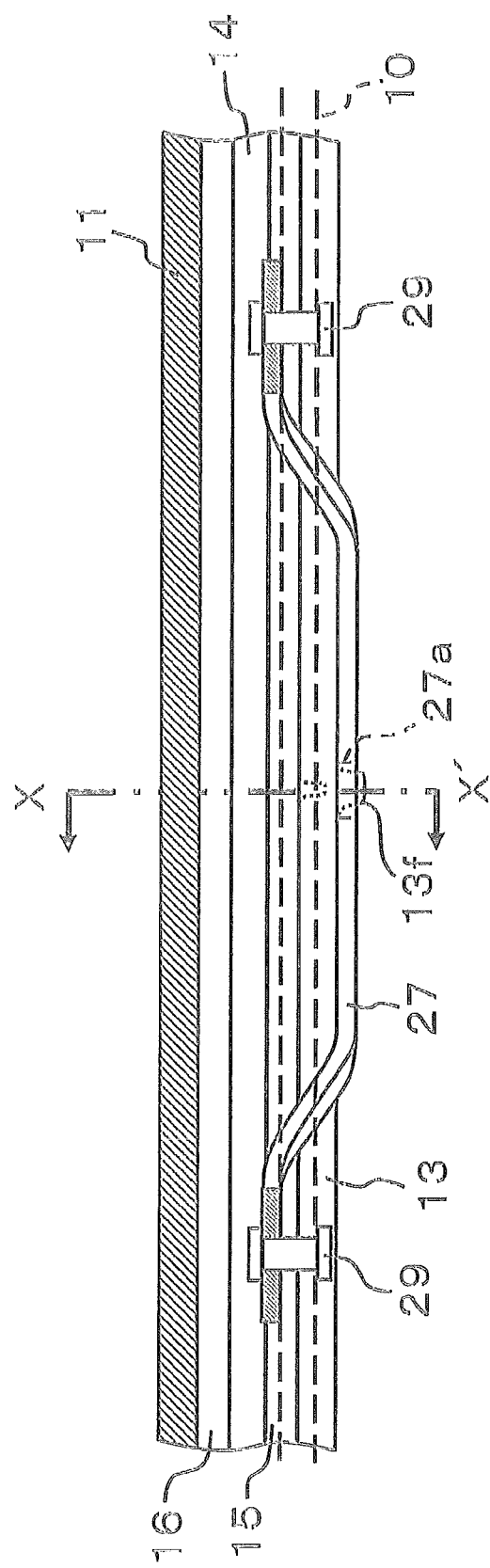
FIG. 20 is an enlarged radial partial cross-sectional view, corresponding to a cross-section taken along line Y-Y' of FIGS. 18 and 19, and schematically showing the structure of the limiter unit in the torque fluctuation absorber according to Example 9 of the present disclosure.

A torque fluctuation absorber according to Example 9 of the present disclosure will now be described with reference to the drawings. FIG. 18 depicts an enlarged partial radial cross-sectional view (cross-section taken along lines X-X' of FIGS. 19 and 20) schematically showing the structure of a limiter unit in the torque fluctuation absorber according to Example 9 of the present disclosure. FIG. 19 depicts a plan view schematically showing the structure of a pressure plate of the limiter unit in the torque fluctuation absorber according to Example 9 of the present disclosure. FIG. 20 depicts an enlarged partial radial cross-sectional view (cross-section taken along lines Y-Y' of FIGS. 18 and 19) schematically showing the structure of the limiter unit in the torque fluctuation absorber according to Example 9.

In Example 9, modified from Example 8 (see FIGS. 15 to 17), no rivet is used for interconnecting the sheet spring 27 and the pressure plate 13. Instead, protrusions 13f are formed on the pressure plate 13, and a hole 27a, mating with the protrusion 13f, is bored in the sheet spring 27. The sheet spring 27 is secured by the rivets 29 at two points to the support plate 10. The protrusion 13f of the pressure plate 13 is projected towards the flywheel 5. The protrusion 13f is introduced into the hole 27a of the sheet spring 27 to prevent its movement in the circumferential and radial directions is prevented. In other respects, the present Example is similar to Example 8.

In Example 9, in which the sheet spring 27, higher in yield than a conical spring 12, is used, the entire device may be lowered in cost. Moreover, since the sheet spring 27 has a torque transmitting function, a rotation stop unit that halts rotation of the pressure plate 13 relative to the cover plate 11 (protrusion 13a and the hole 11a of FIG. 2) may be dispensed with, thereby reducing the cost and the space. In addition, since the sheet spring 27 and the pressure plate 13 are interconnected by having the protrusion 13f of the pressure plate 13 engaged in the hole 27a of the sheet spring 27, the pressure plate 13 may be reduced in diameter. Hence, the amount of the steel material to be in use may be reduced, thereby reducing the cost of the device and space.

Example 10

Figure 21:
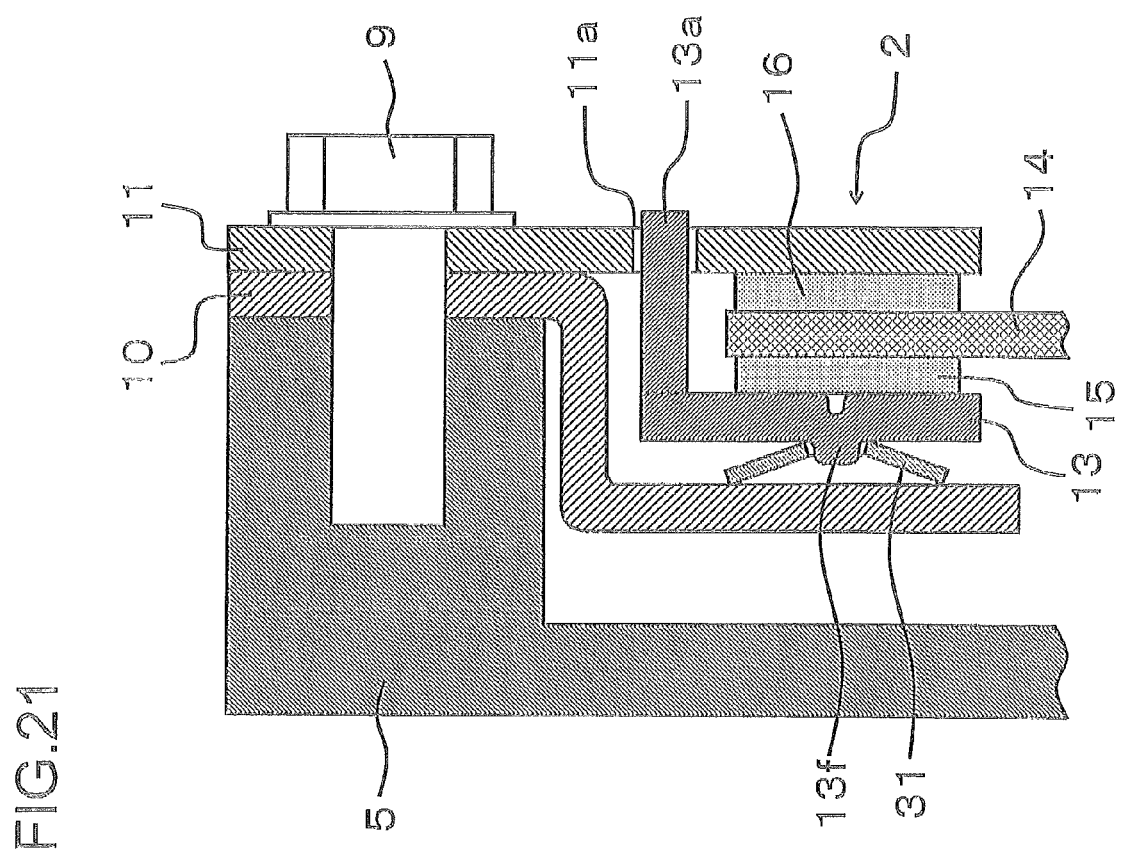
FIG. 21 is an enlarged radial partial cross-sectional view, corresponding to a cross-section taken along line X-X' of FIG. 22, and schematically showing the structure of a limiter unit in a torque fluctuation absorber according to Example 10 of the present disclosure.
Figure 22:
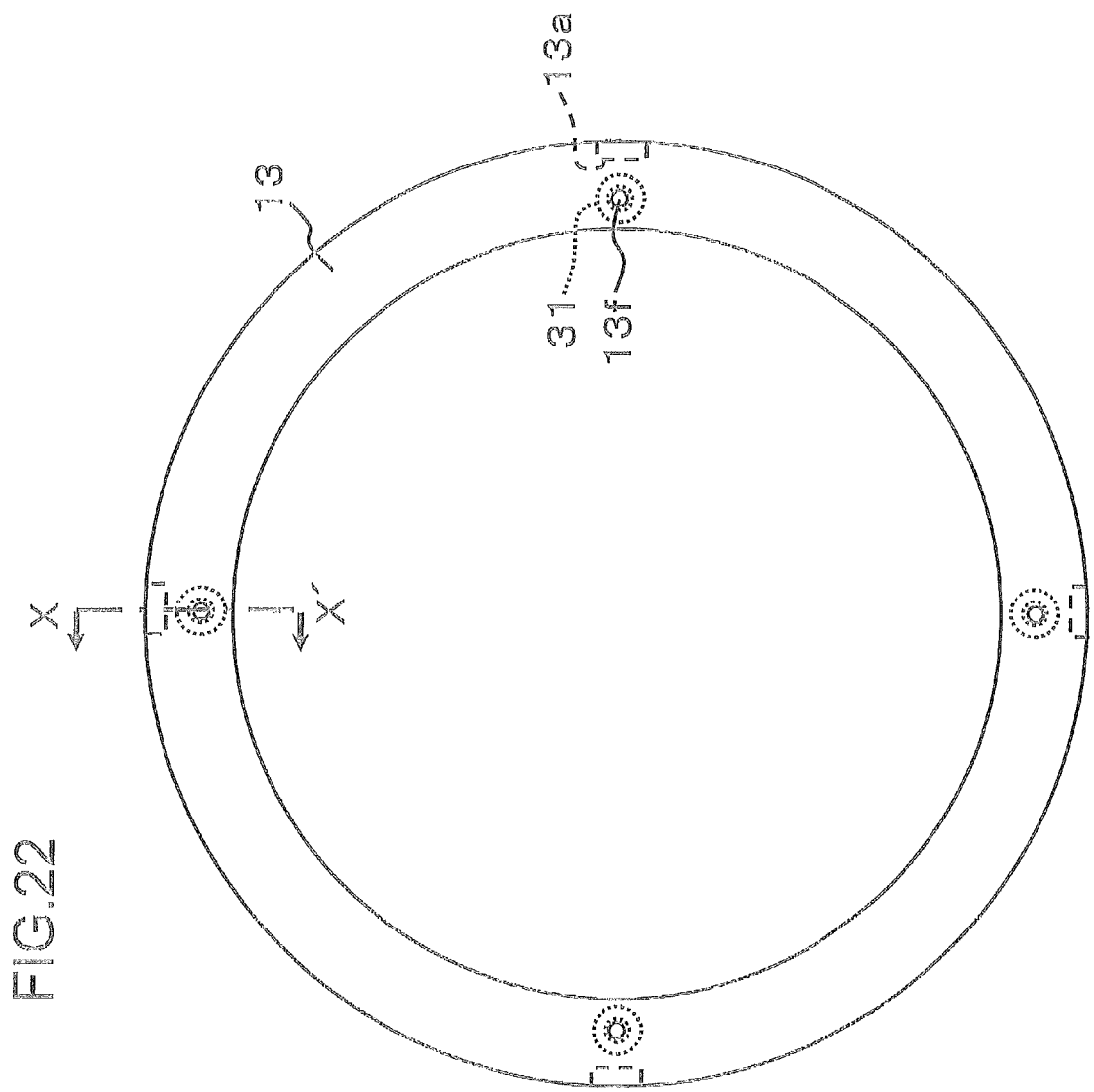
FIG. 22 is a plan view schematically showing the structure of a pressure plate of the limiter unit in the torque fluctuation absorber according to Example 10 of the present disclosure.

A torque fluctuation absorber according to Example 10 of the present disclosure will now be described with reference to the drawings. FIG. 21 depicts an enlarged partial radial cross-sectional view (cross-section taken along line X-X' of FIG. 22) schematically showing the structure of a limiter unit in the torque fluctuation absorber according to Example 10 of the present disclosure. FIG. 22 is a plan view schematically showing the structure of a pressure plate of the limiter unit of the torque fluctuation absorber according to Example 10.

In Example 10, modified from Example 1 (see FIG. 2), a plurality of conical springs 31, each being of a smaller diameter corresponding to the radial extent of the friction material 15, are used in place of a sole conical spring of a larger diameter (12 of FIG. 2) as in Example 1. The pressure plate 13 includes a plurality of protrusions 13f mating with holes bored in the inner rim of the conical springs 31. The protrusions 13f prevent the movement of the conical springs 31 in the circumferential and radial directions. The inner peripheral ends of the conical springs 31 abut against the portions of the pressure plate 13 located on the outer periphery of the protrusions 13f of the pressure plate 13, with the outer peripheral ends of the conical springs 31 abutting against the support plate 10. The conical springs 31 bias the pressure plate 13 towards the friction material 15. The center axis of the conical spring 31 is located in an area of the portion of the pressure plate 13 axially facing the lining plate 14, viz., within the extent of the radial length of the friction material 15. In other respects, the present Example is similar to Example 8.

In FIG. 21, the conical spring 31 has the inner peripheral end abutted against the outer peripheral area of the protrusion 13f of the pressure plate 13, while having the outer peripheral end abutted against the support plate 10. Conversely, the conical spring 31 may also have the outer peripheral end abutted against the outer peripheral area of the protrusion 13f of the pressure plate 13, while having the inner peripheral end abutted against the support plate 10. In the latter case, a protrusion like the protrusion 13f provided on the pressure plate 13 is preferably formed on the support plate 10.

In Example 10, in which the multiple conical springs 31 of smaller diameters are used, the yield of the spring steel material may be improved, thus reducing the cost of the entire device.

Example 11

Figure 23:
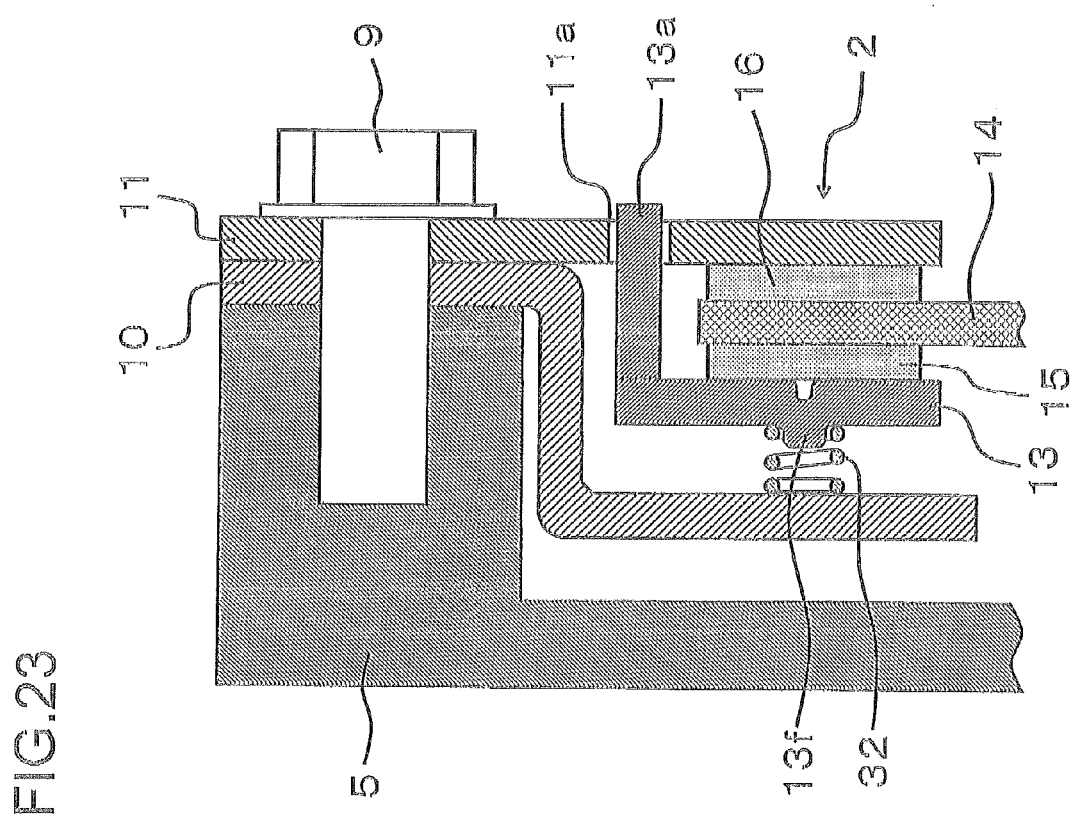
FIG. 23 is an enlarged radial partial cross-sectional view schematically showing the structure of a limiter unit in a torque fluctuation absorber according to Example 11 of the present disclosure.

A torque fluctuation absorber according to Example 11 of the present disclosure will now be described with reference to the drawings. FIG. 23 depicts an enlarged partial radial cross-sectional view schematically showing the structure of a limiter unit in the torque fluctuation absorber according to Example 11 of the present disclosure.

In Example 11, modified from Example 10 (see FIGS. 21 and 22), a plurality of coil springs 32 of smaller diameters are used in place of the multiple conical springs of smaller diameters. The pressure plate includes a plurality of protrusions 13f mating with the inner peripheral bores in the coil springs 32. The protrusions 13f prevent circumferential and radial movements of the coil springs 32. Each coil spring 32 has its one end abutted against the pressure plate 13 in an area of an outer periphery of the protrusion 13f of the pressure plate 13, while having its outer peripheral end abutted against the support plate 10. Each coil spring 32 biases the pressure plate 13 towards the friction material 15. The center axis of the coil spring 32 is located within the area of axial opposition of the pressure plate 13 to the lining plate 14, that is, within the extent of the radial length of the friction material 15. In other respects, the Example 11 is similar to Example 10.

In FIG. 23, the protrusions 13f is provided on the pressure plate 13. The protrusion may, however, be provided on only the support plate 10, or on each of the pressure plate 13 and the support plate 10.

In Example 11, in which the coil springs 32 of smaller diameters are used, the production yield may be improved, thus lowering the cost of the entire device.

Example 12

A torque fluctuation absorber according to Example 12 of the present disclosure will now be described with reference to the drawings. FIG. 24A depicts an enlarged partial radial cross-sectional view schematically showing the structure of a conical spring 12 of a limiter unit in the torque fluctuation absorber according to Example 12 of the present disclosure, during its preparation, and FIG. 24B depicts a similar enlarged partial radial cross-sectional view schematically showing the structure of the conical spring after completion. FIG. 25 depicts an enlarged partial radial cross-sectional view schematically showing the structure of a modification of the conical spring 12 of the limiter unit in the torque fluctuation absorber according to Example 12 of the present disclosure.

In Example 12, modified from the conical spring 12 of Example 1 (12 of FIG. 2), a conical spring 33, composed of a plain sheet-shaped steel material, is bent to form an annular conical shape for use in place of the non-interrupted conical spring (12 of FIG. 2) of Example 1. The ends of the conical spring 33 are not joined together (i.e., forming free ends with or/without a gap). As in Example 1, the inner peripheral end of the conical spring 33 abuts against the pressure plate (13 of FIG. 2). A mid part of an inclined surface of the conical spring 33, facing an inner rim side, abuts against the fulcrum point (10b of FIG. 2) of the step (10a of FIG. 2) of the support plate (10 of FIG. 2), with the outer rim side end of the conical spring being spaced apart from the support plate (10 of FIG. 2). The conical spring 33 biases the pressure plate 13 towards the friction material 15. Meanwhile, both circumferential ends of the conical spring 33 may overlap with each other (see FIG. 25).

In Example 12, in which the conical spring 33, the ends of which are not joined to each other, is used, the yield of the spring steel material may be improved, thus reducing the cost. In addition, if both ends of the conical spring 33 are overlapped together, the load may be made even to allow a larger load to be produced.

Example 13

Figure 26:
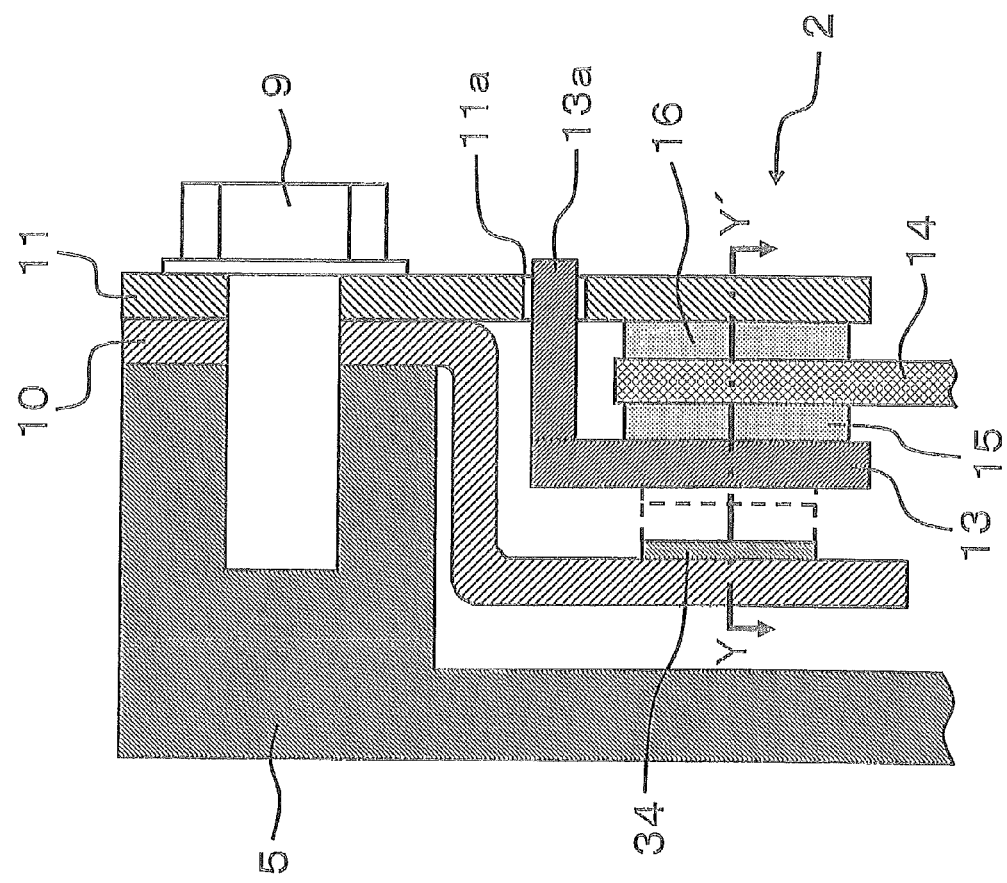
FIG. 26 is an enlarged radial partial cross-sectional view, corresponding to a cross-section taken along line X-X' of FIG. 27, and schematically showing the structure of a limiter unit in a torque fluctuation absorber according to Example 13 of the present disclosure.
Figure 27:
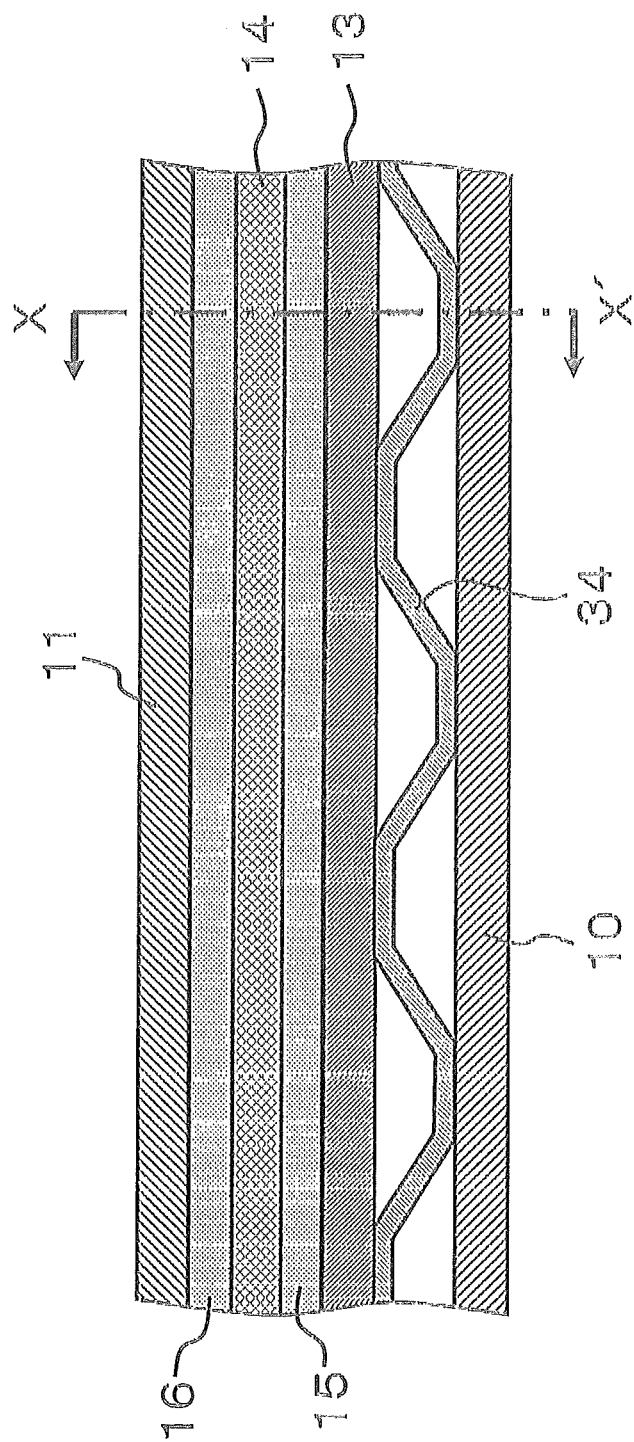
FIG. 27 is an enlarged radial partial cross-sectional view, corresponding to a cross-section taken along line Y-Y' of FIG. 26, and schematically showing the structure of the limiter unit in the torque fluctuation absorber according to Example 13 of the present disclosure.

A torque fluctuation absorber according to Example 13 of the present disclosure will now be described with reference to the drawings. FIG. 26 depicts an enlarged partial radial cross-sectional view (cross-section taken along line X-X' of FIG. 27) schematically showing the structure of a limiter unit in the torque fluctuation absorber according to Example 13 of the present disclosure. FIG. 27 depicts a similar enlarged partial radial cross-sectional view (cross-section taken along line Y-Y' of FIG. 26) schematically showing the structure of the limiter unit in the torque fluctuation absorber according to Example 13.

FIG. 13, modified from Example 1, uses a corrugated spring 34 in place of using a non-interrupted conical spring of Example 1 (12 of FIG. 2). The corrugated spring 34 is obtained on forming a plane sheet-shaped spring steel material into an annular corrugated shape. The extreme ends of the corrugated spring 34 are not joined together. The corrugated spring 34 alternately abuts against the pressure plate 13 and the support plate 10. The portions of the corrugated spring 34 not abutting against the pressure plate 13 or the support plate 10 operate as a sheet spring. The corrugated spring 34 biases the pressure plate 13 towards the friction material 15. It is noted that, to prevent circumferential as well as radial movement of the corrugated spring 34, the corrugated spring 34 may be secured by a rivet, not shown, to the support plate 10, while the support plate 10 may be provided with the guide 10c shown in FIG. 4. In other respects, the Example 11 is similar to Example 10.

In Example 13, in which the corrugated spring 34, whose extreme ends are not joined together, is used, the spring steel material may be improved in yield, while the cost of the entire product may be lowered. Moreover, the corrugated spring 34 is easier in forming than the conical spring.

The particular exemplary embodiments or examples may be modified or adjusted within the gamut of the entire disclosure of the present disclosure, inclusive of claims, based on the fundamental technical concept of the disclosure. Further, variegated combinations or selections of elements disclosed herein may be made within the scope of the claims. That is, the present disclosure may encompass various modifications or corrections that may occur to those skilled in the art in accordance with and within the gamut of the entire disclosure thereof, inclusive of claim and the technical concept of the present disclosure.

EXPLANATION OF NUMERALS 1 torque fluctuation absorber
2 limiter unit
3 damper unit
4 hysteresis unit
5 flywheel
5a protrusion
6 engine side rotational shaft (first rotational shaft)
7 transmission side rotational shaft (second rotational shaft)
8, 9 bolts
10 support plate (fourth plate member)
10a step
10b fulcrum point
10c guide
10d flexure part
10e, 10f steps
10g rotation stop
11 cover plate (first plate member)
11a hole
12 conical spring (resilient member)
12a abutment
13 pressure plate (second plate member)
13a protrusion
13b circumferential protrusion (fulcrum point and guide part)
13c outer peripheral protrusion
13d circumferential extension
13e inner peripheral protrusion
13f protrusion
14 lining plate (third plate member)
15, 16 friction materials
17 side plate
17a window
18 side plate
18a window
19 rivet
20 coil spring
21 seat member
22, 23 thrust members
24 conical spring
25 hub member
25a hub part
25b flange part
25c window
27 sheet spring
27a hole
28, 29 rivets
31 conical spring (resilient member)
32 coil spring
33 conical spring (resilient member)
34 corrugated spring (resilient member)

What is claimed is:

1. A torque fluctuation absorber, comprising:
   a first plate member to which power of rotation is transmitted from a first rotational shaft;
   a second plate member arranged at a preset distance from the first plate member;
   a third plate member arranged between the first and second plate members and configured to transmit power of rotation to a second rotational shaft;
   a fourth plate member arranged at a preset distance from the second plate member; and
   a resilient member arranged between the second plate member and the fourth plate member and configured to bias the second plate member towards the third plate member;
   at least one of the second plate member and the fourth plate member having a fulcrum point supporting a mid portion of the resilient member,
   wherein the fulcrum point is a bent edge of a step formed on at least one of the second plate member and the fourth plate member.

2. The torque fluctuation absorber according to claim 1, wherein
   the resilient member is a conical spring.

3. The torque fluctuation absorber according to claim 1, wherein
   the fulcrum point is formed on the fourth plate member.

4. The torque fluctuation absorber according to claim 1, further comprising:
   a flywheel to which the first and fourth plate members are secured.

* * * * *